US010706770B2

(12) United States Patent
Hall

(10) Patent No.: US 10,706,770 B2
(45) Date of Patent: Jul. 7, 2020

(54) DISPLAY SYSTEM HAVING MODULE DISPLAY PANEL WITH CIRCUITRY FOR BIDIRECTIONAL COMMUNICATION

(71) Applicant: Ultravision Technologies, LLC, Dallas, TX (US)

(72) Inventor: William Y. Hall, Dallas, TX (US)

(73) Assignee: ULTRAVISION TECHNOLOGIES, LLC, Dallas, TX (US)

( * ) Notice: Subject to any disclaimer, the term of this patent is extended or adjusted under 35 U.S.C. 154(b) by 0 days.

(21) Appl. No.: 14/720,544

(22) Filed: May 22, 2015

(65) Prior Publication Data

US 2016/0019831 A1  Jan. 21, 2016

Related U.S. Application Data

(60) Provisional application No. 62/158,989, filed on May 8, 2015, provisional application No. 62/113,342, filed
(Continued)

(51) Int. Cl.
*G09G 3/3208* (2016.01)
*G06F 1/16* (2006.01)
(Continued)

(52) U.S. Cl.
CPC ......... *G09G 3/3208* (2013.01); *G06F 1/1601* (2013.01); *G06F 1/20* (2013.01); *G06F 3/1446* (2013.01); *G09F 13/22* (2013.01); *G09F 15/0006* (2013.01); *G09G 3/006* (2013.01); *G09G 3/2096* (2013.01); *G09G 3/32* (2013.01); *G09G 3/3233* (2013.01); *G09G 3/3406* (2013.01); *G09G 3/3413* (2013.01);
(Continued)

(58) Field of Classification Search
None
See application file for complete search history.

(56) References Cited

U.S. PATENT DOCUMENTS 1,816,254 A 7/1931 Heath
3,150,455 A 9/1964 Indorf
(Continued)

FOREIGN PATENT DOCUMENTS

CN  2520549 Y  11/2002
CN  2544372 Y  4/2003
(Continued)

OTHER PUBLICATIONS

Daktronics, "The Smarter Approach to Digital Outdoor," Daktronics Digital Billboard Products, 2013, 16 pages.
(Continued)

*Primary Examiner* — Christopher R Lamb
(74) *Attorney, Agent, or Firm* — Slater Matsil, LLP

(57) ABSTRACT

A modular display panel includes a plastic housing having a recess, a printed circuit board disposed in the recess, a plurality of light emitting diodes (LEDs) attached to the printed circuit board, a transparent potting compound overlying the LEDs, a driver circuit attached to the printed circuit board, and a heat sink disposed between a back side of the housing and the printed circuit board. The heat sink thermally contacts the back side of the housing and the printed circuit board. The panel also includes a power supply and a network interface controller.

24 Claims, 15 Drawing Sheets

Related U.S. Application Data on Feb. 6, 2015, provisional application No. 62/093,157, filed on Dec. 17, 2014, provisional application No. 62/065,510, filed on Oct. 17, 2014, provisional application No. 62/025,463, filed on Jul. 16, 2014.

(51) Int. Cl.

| | |
|---|---|
| *G09G 3/34* | (2006.01) |
| *G09G 3/20* | (2006.01) |
| *G09G 5/00* | (2006.01) |
| *G06F 1/20* | (2006.01) |
| *G06F 3/14* | (2006.01) |
| *G09F 13/22* | (2006.01) |
| *G09F 15/00* | (2006.01) |
| *G09G 3/00* | (2006.01) |
| *G09G 3/32* | (2016.01) |
| *G09G 3/3233* | (2016.01) |

(52) U.S. Cl.
CPC .......... *G09G 3/3426* (2013.01); *G09G 5/003* (2013.01); *G06F 2200/1612* (2013.01); *G09F 2013/222* (2013.01); *G09G 2300/026* (2013.01); *G09G 2310/024* (2013.01); *G09G 2310/0235* (2013.01); *G09G 2320/041* (2013.01); *G09G 2320/062* (2013.01); *G09G 2320/064* (2013.01); *G09G 2320/0633* (2013.01); *G09G 2320/0693* (2013.01); *G09G 2330/02* (2013.01); *G09G 2330/12* (2013.01); *G09G 2354/00* (2013.01); *G09G 2360/04* (2013.01); *G09G 2360/14* (2013.01); *G09G 2360/141* (2013.01); *G09G 2360/144* (2013.01); *G09G 2360/145* (2013.01); *G09G 2360/16* (2013.01); *G09G 2370/04* (2013.01); *G09G 2380/06* (2013.01)

(56) References Cited

U.S. PATENT DOCUMENTS

| | | | |
|---|---|---|---|
| 4,457,090 A | | 7/1984 | McDonough |
| 4,497,125 A | | 2/1985 | Hutchinson |
| 4,637,674 A | | 6/1987 | Kobler |
| 4,782,336 A | | 11/1988 | Bailey |
| 4,964,231 A | | 10/1990 | De Maat et al. |
| 5,036,248 A | | 7/1991 | McEwan et al. |
| 5,172,504 A | | 12/1992 | De Maat et al. |
| 5,313,729 A | | 5/1994 | Sakai et al. |
| 5,341,088 A | | 8/1994 | Davis |
| 5,379,202 A | | 1/1995 | Daun |
| 5,410,328 A | | 4/1995 | Yoksza et al. |
| 5,446,440 A | | 8/1995 | Gleason et al. |
| 5,523,769 A | | 6/1996 | Lauer et al. |
| 5,563,470 A | | 10/1996 | Li |
| 5,600,910 A | | 2/1997 | Blackburn |
| 5,722,767 A | | 3/1998 | Lin |
| 5,785,415 A | | 7/1998 | Matsumura et al. |
| 5,796,376 A | | 8/1998 | Banks |
| 5,900,850 A | | 5/1999 | Bailey et al. |
| 5,914,698 A | * | 6/1999 | Nicholson ............... G06F 3/147 340/908.1 |
| 5,949,581 A | | 9/1999 | Kurtenbach et al. |
| 5,990,802 A | | 11/1999 | Maskeny |
| 5,991,153 A | * | 11/1999 | Heady .................... H05K 7/202 165/185 |
| 6,045,240 A | | 4/2000 | Hochstein |
| 6,065,854 A | | 5/2000 | West et al. |
| 6,114,632 A | | 9/2000 | Planas, Sr. et al. |
| 6,150,996 A | | 11/2000 | Nicholson et al. |
| 6,162,849 A | | 12/2000 | Zhuo et al. |
| 6,169,632 B1 | | 1/2001 | Kurtenbach et al. |
| 6,175,342 B1 | | 1/2001 | Nicholson et al. |
| 6,208,073 B1 | | 3/2001 | Wang et al. |
| 6,237,290 B1 | | 5/2001 | Tokimoto et al. |
| 6,314,669 B1 | | 11/2001 | Tucker |
| 6,329,593 B1 | | 12/2001 | Yang |
| 6,335,829 B1 | | 1/2002 | Van De Voorde |
| 6,362,801 B1 | | 3/2002 | Yuhara |
| 6,364,507 B1 | | 4/2002 | Yang |
| 6,414,650 B1 | | 7/2002 | Nicholson et al. |
| 6,441,943 B1 | | 8/2002 | Roberts et al. |
| 6,445,373 B1 | | 9/2002 | Yamamoto |
| 6,473,002 B1 | | 10/2002 | Hutchison |
| 6,550,521 B1 | | 4/2003 | McNabb |
| 6,558,021 B2 | | 5/2003 | Wu et al. |
| 6,570,548 B2 | | 5/2003 | Smith |
| 6,582,100 B1 | | 6/2003 | Hochstein et al. |
| 6,595,671 B2 | | 7/2003 | Lefebvre et al. |
| 6,608,264 B1 | | 8/2003 | Fouladpour |
| 6,634,124 B1 | | 10/2003 | Bierschbach |
| 6,657,605 B1 | | 12/2003 | Boldt, Jr. et al. |
| 6,677,918 B2 | | 1/2004 | Yuhara et al. |
| 6,693,551 B2 | | 2/2004 | Pederson |
| 6,731,077 B1 | | 5/2004 | Cheng |
| 6,737,983 B1 | | 5/2004 | Temple |
| 6,741,222 B1 | | 5/2004 | Tucker |
| 6,810,612 B2 | | 11/2004 | Huang |
| 6,813,853 B1 | | 11/2004 | Tucker |
| 6,819,303 B1 | | 11/2004 | Berger et al. |
| 6,834,001 B2 | | 12/2004 | Myono |
| 6,924,973 B2 | | 8/2005 | Kim |
| 6,932,495 B2 | | 8/2005 | Sloan et al. |
| 6,956,541 B2 | | 10/2005 | Mcclintock |
| 6,956,545 B2 | | 10/2005 | Mcclintock et al. |
| 6,998,538 B1 | | 2/2006 | Fetterolf, Sr. et al. |
| 7,055,271 B2 | | 6/2006 | Lutz et al. |
| 7,064,674 B2 | | 6/2006 | Pederson |
| 7,072,407 B2 | | 7/2006 | Schurig |
| 7,080,927 B2 | | 7/2006 | Feuerborn et al. |
| 7,086,188 B2 | | 8/2006 | Tsao |
| 7,091,933 B2 | | 8/2006 | McClintock et al. |
| 7,102,601 B2 | | 9/2006 | Devos et al. |
| 7,131,226 B2 | | 11/2006 | Gray et al. |
| 7,138,659 B2 | | 11/2006 | Raos et al. |
| 7,144,748 B2 | | 12/2006 | Popovich |
| 7,161,558 B1 | | 1/2007 | Eidem et al. |
| 7,170,480 B2 | | 1/2007 | Boldt, Jr. et al. |
| 7,191,506 B2 | | 3/2007 | Gray et al. |
| 7,204,602 B2 | | 4/2007 | Archer |
| 7,207,693 B2 | | 4/2007 | Ratcliffe |
| 7,210,957 B2 | | 5/2007 | Mrakovich et al. |
| 7,220,022 B2 | | 5/2007 | Allen et al. |
| 7,244,044 B2 | | 7/2007 | Liao |
| 7,244,058 B2 | | 7/2007 | DiPenti et al. |
| 7,245,279 B2 | | 7/2007 | Wang |
| 7,267,459 B2 | | 9/2007 | Matheson |
| 7,268,501 B1 | | 9/2007 | Chen |
| 7,287,878 B2 | | 10/2007 | Miller |
| 7,311,431 B2 | | 12/2007 | Chew et al. |
| 7,319,408 B2 | | 1/2008 | Temple |
| 7,325,955 B2 | | 2/2008 | Lucas et al. |
| 7,334,361 B2 | | 2/2008 | Schrimpf et al. |
| 7,336,195 B2 | | 2/2008 | Van De Ven |
| 7,355,562 B2 | | 4/2008 | Schubert et al. |
| 7,377,669 B2 | | 5/2008 | Farmer et al. |
| 7,450,085 B2 | | 11/2008 | Thielemans et al. |
| 7,473,020 B2 | | 1/2009 | Pickering |
| 7,495,576 B2 | | 2/2009 | Maskeny et al. |
| 7,502,950 B1 | | 3/2009 | Brands |
| 7,520,628 B1 | | 4/2009 | Sloan et al. |
| 7,543,976 B2 | | 6/2009 | Abogabir |
| 7,549,777 B2 | | 6/2009 | Huang |
| 7,557,781 B2 | | 7/2009 | Chuang et al. |
| 7,572,043 B2 | | 8/2009 | Kolstee et al. |
| 7,576,707 B2 | | 8/2009 | Nishimura |
| 7,605,772 B2 | | 10/2009 | Syrstad |
| 7,614,771 B2 | | 11/2009 | Mckechnie et al. |
| 7,665,874 B2 | | 2/2010 | Chadwell et al. |
| 7,674,000 B2 | | 3/2010 | Valerio, Jr. et al. |
| 7,688,280 B2 | | 3/2010 | Callegari et al. |
| 7,694,444 B2 | | 4/2010 | Miller et al. |
| 7,703,941 B2 | | 4/2010 | Lee |

(56) References Cited

U.S. PATENT DOCUMENTS

| | | |
|---|---|---|
| 7,774,968 B2 | 8/2010 | Nearman et al. |
| 7,779,568 B2 | 8/2010 | Gettelfinger et al. |
| 7,797,865 B2 | 9/2010 | Patel et al. |
| 7,823,308 B1 | 11/2010 | Munson et al. |
| 7,868,903 B2 | 1/2011 | Wendler et al. |
| 7,869,198 B1 | 1/2011 | Nearman et al. |
| 7,907,133 B2 | 3/2011 | Joffer et al. |
| 7,926,213 B1 | 4/2011 | Kludt et al. |
| 7,928,968 B2 | 4/2011 | Shon et al. |
| 7,950,174 B2 | 5/2011 | Xu |
| 7,971,378 B2 | 7/2011 | Campoy Odena |
| 7,972,031 B2 | 7/2011 | Ray et al. |
| 7,994,516 B2 | 8/2011 | Chan et al. |
| 8,007,121 B2 | 8/2011 | Elliott et al. |
| 8,016,452 B2 | 9/2011 | Dunn |
| 8,066,403 B2 | 11/2011 | Sanfilippo et al. |
| 8,074,387 B2 | 12/2011 | Mancuso |
| 8,081,145 B2 | 12/2011 | Ronkholz et al. |
| 8,092,046 B2 | 1/2012 | Wu et al. |
| 8,104,204 B1 | 1/2012 | Syrstad |
| 8,111,208 B2 | 2/2012 | Brown |
| 8,113,687 B2 | 2/2012 | Villard et al. |
| 8,115,229 B2 | 2/2012 | Christy |
| 8,122,627 B2 | 2/2012 | Miller |
| 8,130,175 B1 | 3/2012 | Joffer et al. |
| 8,136,277 B2 | 3/2012 | Patterson et al. |
| 8,136,279 B1 | 3/2012 | Nearman et al. |
| 8,154,864 B1 | 4/2012 | Nearman et al. |
| 8,156,672 B2 | 4/2012 | Xu |
| 8,168,990 B2 | 5/2012 | Christy |
| 8,172,097 B2 | 5/2012 | Nearman et al. |
| 8,183,794 B2 | 5/2012 | Grajcar |
| 8,184,114 B2 | 5/2012 | Oh et al. |
| 8,228,261 B2 | 7/2012 | Callegari et al. |
| 8,246,220 B2 | 8/2012 | Epstein et al. |
| 8,269,700 B2 | 9/2012 | Joffer et al. |
| 8,281,344 B1 | 10/2012 | Mathias |
| 8,301,939 B2 | 10/2012 | Gloege et al. |
| 8,314,433 B2 | 11/2012 | Christy |
| 8,344,410 B2 | 1/2013 | Wendler et al. |
| 8,350,788 B1 | 1/2013 | Nearman et al. |
| 8,362,696 B2 | 1/2013 | Zheng |
| 8,368,112 B2 | 2/2013 | Chan et al. |
| D681,263 S | 4/2013 | Van Eekeren et al. |
| 8,410,993 B2 | 4/2013 | Jenks et al. |
| 8,414,149 B2 | 4/2013 | Nearman |
| 8,434,898 B2 | 5/2013 | Sanfilippo et al. |
| 8,465,178 B2 | 6/2013 | Wilcox et al. |
| 8,522,494 B2 | 9/2013 | Ward |
| 8,552,928 B2 | 10/2013 | Wendler et al. |
| 8,558,755 B2 | 10/2013 | Kharrati et al. |
| 8,581,269 B2 | 11/2013 | Kuk et al. |
| 8,599,108 B2 | 12/2013 | Kline et al. |
| 8,604,509 B2 | 12/2013 | Wendler et al. |
| 8,610,779 B2 | 12/2013 | Wu |
| 8,624,425 B2 | 1/2014 | Feng et al. |
| 8,648,774 B2 | 2/2014 | Kline et al. |
| 8,678,612 B2 | 3/2014 | Jasmin, Jr. et al. |
| 8,697,458 B2 | 4/2014 | Nolan et al. |
| 8,702,048 B2 | 4/2014 | Kludt et al. |
| 8,702,262 B2 | 4/2014 | Park et al. |
| 8,714,665 B2 | 5/2014 | Campagna et al. |
| 8,740,408 B2 | 6/2014 | Yoon et al. |
| 8,766,880 B2 | 7/2014 | Kharrati et al. |
| 8,794,795 B2 | 8/2014 | Yaphe et al. |
| 8,803,766 B2 | 8/2014 | Kline et al. |
| 8,824,124 B1 | 9/2014 | Carlson et al. |
| 8,824,125 B1 | 9/2014 | Cox et al. |
| 8,858,028 B2 | 10/2014 | Kim |
| 8,870,395 B2 | 10/2014 | Wu |
| 8,922,458 B2 | 12/2014 | Sefton et al. |
| 8,929,083 B2 | 1/2015 | Cox et al. |
| 8,932,123 B2 | 1/2015 | Murayama et al. |
| 8,963,895 B2 | 2/2015 | Cope et al. |
| 9,013,367 B2 | 4/2015 | Cope |
| 9,018,846 B2 | 4/2015 | Chew |
| 9,047,039 B2 | 6/2015 | Perkins et al. |
| 9,047,791 B2 | 6/2015 | Cox et al. |
| 9,052,085 B2 | 6/2015 | Chan |
| 9,058,755 B2 | 6/2015 | Cope et al. |
| 9,071,809 B2 | 6/2015 | Cope et al. |
| 9,108,261 B1 | 8/2015 | Patrick |
| 9,134,773 B2 | 9/2015 | Hall |
| 9,167,191 B2 | 10/2015 | Kondo et al. |
| 9,228,732 B2 | 1/2016 | Li |
| 9,234,652 B2 | 1/2016 | Wu |
| 9,243,790 B2 | 1/2016 | Speer et al. |
| 9,330,589 B2 | 5/2016 | Cope et al. |
| 9,349,306 B2 | 5/2016 | Hall |
| 9,412,926 B2 | 8/2016 | Keller et al. |
| 9,494,302 B2 | 11/2016 | Shen et al. |
| 9,538,588 B2 | 1/2017 | Mutschelknaus et al. |
| 9,546,781 B2 | 1/2017 | Myers |
| 9,587,814 B2 | 3/2017 | Carney et al. |
| 9,615,474 B2 | 4/2017 | He et al. |
| 9,655,267 B2 | 5/2017 | Cope et al. |
| 9,711,690 B2 | 7/2017 | Li et al. |
| 9,863,586 B2 | 1/2018 | Yang et al. |
| 9,916,782 B2 | 3/2018 | Hall |
| 9,964,261 B2 | 5/2018 | Ying et al. |
| 2001/0037591 A1 | 11/2001 | Nicholson et al. |
| 2002/0122134 A1 | 9/2002 | Kalua |
| 2002/0126086 A1 | 9/2002 | Takeuchi et al. |
| 2002/0176267 A1 | 11/2002 | Tanaka et al. |
| 2003/0034963 A1 | 2/2003 | Moon et al. |
| 2003/0058191 A1 | 3/2003 | Yuhara et al. |
| 2003/0058666 A1 | 3/2003 | Myono |
| 2003/0117420 A1 | 6/2003 | Ando et al. |
| 2003/0120236 A1 | 6/2003 | Graef et al. |
| 2003/0146882 A1 | 8/2003 | Ogino et al. |
| 2003/0156406 A1 | 8/2003 | Galli |
| 2003/0156407 A1 | 8/2003 | Galli |
| 2003/0158886 A1 | 8/2003 | Walls et al. |
| 2003/0167666 A1 | 9/2003 | Close |
| 2003/0193816 A1 | 10/2003 | Rahn |
| 2003/0210236 A1 | 11/2003 | Martin et al. |
| 2004/0008155 A1 | 1/2004 | Cok |
| 2004/0040248 A1 | 3/2004 | Vilnes |
| 2004/0090391 A1 | 5/2004 | Kondo |
| 2004/0104871 A1 | 6/2004 | Boldt, Jr. et al. |
| 2004/0123501 A1 | 7/2004 | Safavi et al. |
| 2004/0186723 A1 | 9/2004 | Mizutani et al. |
| 2004/0196049 A1 | 10/2004 | Yano et al. |
| 2004/0222941 A1 | 11/2004 | Wong et al. |
| 2004/0240230 A1 | 12/2004 | Kitajima et al. |
| 2005/0052373 A1 | 3/2005 | Devos et al. |
| 2005/0052374 A1* | 3/2005 | Devos et al. .................. 345/82 |
| 2005/0052375 A1 | 3/2005 | Devos et al. |
| 2005/0078104 A1 | 4/2005 | Matthies et al. |
| 2005/0081414 A1 | 4/2005 | Lutz et al. |
| 2005/0116667 A1 | 6/2005 | Mueller et al. |
| 2005/0128751 A1* | 6/2005 | Roberge .................. F21K 9/00 362/276 |
| 2005/0134525 A1 | 6/2005 | Tanghe et al. |
| 2005/0134526 A1* | 6/2005 | Willem et al. ................. 345/1.3 |
| 2005/0151708 A1 | 7/2005 | Farmer et al. |
| 2005/0178034 A1 | 8/2005 | Schubert et al. |
| 2005/0189311 A1 | 9/2005 | Colby et al. |
| 2005/0190520 A1 | 9/2005 | Schomaker et al. |
| 2005/0212717 A1 | 9/2005 | Baumstark |
| 2005/0213328 A1* | 9/2005 | Matheson ................. F21K 9/00 362/267 |
| 2005/0231949 A1 | 10/2005 | Kim et al. |
| 2005/0259036 A1 | 11/2005 | Callegari et al. |
| 2005/0259418 A1 | 11/2005 | Callegari et al. |
| 2005/0264471 A1 | 12/2005 | Yamazaki et al. |
| 2006/0017658 A1 | 1/2006 | Biondo et al. |
| 2006/0028594 A1 | 2/2006 | Chou |
| 2006/0031720 A1 | 2/2006 | Choi |
| 2006/0039142 A1 | 2/2006 | Temple |
| 2006/0055641 A1 | 3/2006 | Robertus et al. |
| 2006/0056169 A1 | 3/2006 | Lodhie et al. |
| 2006/0132048 A1 | 6/2006 | Popovich |
| 2006/0139917 A1 | 6/2006 | Ward |

(56) References Cited

U.S. PATENT DOCUMENTS

| | | |
|---|---|---|
| 2006/0164587 A1 | 7/2006 | Oh |
| 2006/0170614 A1 | 8/2006 | Tzong et al. |
| 2006/0171148 A1 | 8/2006 | Huang |
| 2006/0185612 A1 | 8/2006 | Bonner et al. |
| 2006/0227003 A1 | 10/2006 | Ven |
| 2006/0241878 A1 | 10/2006 | Jung et al. |
| 2006/0242871 A1 | 11/2006 | Kondo et al. |
| 2006/0243948 A1 | 11/2006 | Ishiwa et al. |
| 2006/0244681 A1 | 11/2006 | Nakajima |
| 2006/0254103 A1 | 11/2006 | Strick et al. |
| 2006/0256033 A1 | 11/2006 | Chan et al. |
| 2006/0262533 A1 | 11/2006 | Lin et al. |
| 2006/0274493 A1 | 12/2006 | Richardson et al. |
| 2006/0279493 A1 | 12/2006 | Syrstad |
| 2007/0000849 A1 | 1/2007 | Lutz et al. |
| 2007/0008259 A1 | 1/2007 | Barker |
| 2007/0068055 A1 | 3/2007 | Segan et al. |
| 2007/0218751 A1 | 9/2007 | Ward |
| 2007/0241988 A1* | 10/2007 | Zerphy .............. G06F 3/1431 345/1.1 |
| 2007/0247842 A1 | 10/2007 | Zampini et al. |
| 2007/0279314 A1 | 12/2007 | Brown |
| 2008/0047184 A1 | 2/2008 | Dean |
| 2008/0060234 A1 | 3/2008 | Chou et al. |
| 2008/0078733 A1 | 4/2008 | Nearman et al. |
| 2008/0130282 A1 | 6/2008 | Negley |
| 2008/0141571 A1 | 6/2008 | Kottwitz |
| 2008/0141572 A1 | 6/2008 | Tomich et al. |
| 2008/0263924 A1 | 10/2008 | Nearman et al. |
| 2008/0266206 A1 | 10/2008 | Nelson et al. |
| 2008/0285087 A1 | 11/2008 | Perkins et al. |
| 2008/0303747 A1* | 12/2008 | Velicescu .............. 345/1.3 |
| 2009/0009103 A1 | 1/2009 | Mckechnie et al. |
| 2009/0009945 A1 | 1/2009 | Johnson et al. |
| 2009/0009997 A1 | 1/2009 | Sanfilippo et al. |
| 2009/0015997 A1 | 1/2009 | Barajas et al. |
| 2009/0021497 A1 | 1/2009 | Wendler et al. |
| 2009/0021532 A1 | 1/2009 | Gloege et al. |
| 2009/0024929 A1 | 1/2009 | Gloege et al. |
| 2009/0058760 A1 | 3/2009 | Aoki |
| 2009/0073080 A1 | 3/2009 | Meersman et al. |
| 2009/0096711 A1 | 4/2009 | Jang et al. |
| 2009/0121986 A1 | 5/2009 | Tu et al. |
| 2009/0128461 A1 | 5/2009 | Geldard et al. |
| 2009/0146910 A1 | 6/2009 | Gardner |
| 2009/0146918 A1 | 6/2009 | Kline et al. |
| 2009/0146919 A1 | 6/2009 | Kline et al. |
| 2009/0146931 A1* | 6/2009 | Kharrati ............. G06F 3/1446 345/82 |
| 2009/0147028 A1 | 6/2009 | Sefton et al. |
| 2009/0190353 A1 | 7/2009 | Barker |
| 2009/0241388 A1 | 10/2009 | Dunn |
| 2009/0251391 A1 | 10/2009 | Ng et al. |
| 2009/0284978 A1 | 11/2009 | Elliott et al. |
| 2009/0289160 A1 | 11/2009 | Kludt et al. |
| 2009/0296387 A1 | 12/2009 | Reisenauer et al. |
| 2009/0322251 A1* | 12/2009 | Hilgers .............. 315/297 |
| 2010/0019535 A1 | 1/2010 | Chang et al. |
| 2010/0026973 A1 | 2/2010 | Hemphill et al. |
| 2010/0045689 A1 | 2/2010 | Hsieh |
| 2010/0073914 A1 | 3/2010 | Park et al. |
| 2010/0090934 A1 | 4/2010 | Elliott et al. |
| 2010/0109571 A1 | 5/2010 | Nishino et al. |
| 2010/0123732 A1* | 5/2010 | Jenks et al. .............. 345/592 |
| 2010/0135022 A1 | 6/2010 | Deguara |
| 2010/0245109 A1 | 9/2010 | Ashoff et al. |
| 2010/0251583 A1 | 10/2010 | Brown et al. |
| 2010/0270582 A1 | 10/2010 | Nolan et al. |
| 2010/0288895 A1 | 11/2010 | Shamie |
| 2010/0295424 A1 | 11/2010 | Alexander |
| 2010/0295760 A1 | 11/2010 | Somerville |
| 2010/0309185 A1 | 12/2010 | Koester et al. |
| 2011/0002129 A1 | 1/2011 | Zheng et al. |
| 2011/0019414 A1 | 1/2011 | Jiang et al. |
| 2011/0025696 A1 | 2/2011 | Wyatt et al. |
| 2011/0031513 A1 | 2/2011 | Hsieh et al. |
| 2011/0051409 A1 | 3/2011 | Nearman |
| 2011/0057215 A1 | 3/2011 | Chen et al. |
| 2011/0072697 A1 | 3/2011 | Miller |
| 2011/0074833 A1 | 3/2011 | Murayama et al. |
| 2011/0085321 A1 | 4/2011 | Eli |
| 2011/0089824 A1 | 4/2011 | Zheng |
| 2011/0090138 A1 | 4/2011 | Zheng |
| 2011/0096568 A1 | 4/2011 | Schattinger et al. |
| 2011/0116232 A1 | 5/2011 | Brown et al. |
| 2011/0133659 A1 | 6/2011 | Li et al. |
| 2011/0134640 A1 | 6/2011 | Bertele |
| 2011/0138663 A1 | 6/2011 | Chen |
| 2011/0140999 A1 | 6/2011 | Beland et al. |
| 2011/0168653 A1 | 7/2011 | Garrett et al. |
| 2011/0181493 A1 | 7/2011 | Williams et al. |
| 2011/0181495 A1 | 7/2011 | Chu et al. |
| 2011/0188235 A1 | 8/2011 | Bollmann |
| 2011/0188981 A1 | 8/2011 | Bonn et al. |
| 2011/0194284 A1 | 8/2011 | Quaal et al. |
| 2011/0205757 A1 | 8/2011 | Whyte |
| 2011/0216482 A1 | 9/2011 | Moscovitch et al. |
| 2011/0219650 A1 | 9/2011 | Wright et al. |
| 2011/0235332 A1 | 9/2011 | Cheung |
| 2011/0267328 A1 | 11/2011 | Venkatasubramanian et al. |
| 2011/0267699 A1 | 11/2011 | Wu |
| 2012/0005563 A1 | 1/2012 | Gloege et al. |
| 2012/0019490 A1 | 1/2012 | Huang |
| 2012/0021873 A1 | 1/2012 | Brunner |
| 2012/0062540 A1 | 3/2012 | Quadri et al. |
| 2012/0112235 A1* | 5/2012 | Preuschl et al. ............. 257/98 |
| 2012/0206277 A1 | 8/2012 | Cai |
| 2012/0218753 A1 | 8/2012 | Joffer et al. |
| 2012/0218758 A1 | 8/2012 | Wang et al. |
| 2012/0236509 A1 | 9/2012 | Cope et al. |
| 2012/0248950 A1 | 10/2012 | Nibori |
| 2012/0299480 A1 | 11/2012 | Peting et al. |
| 2012/0319926 A1* | 12/2012 | Koebrich .............. G09G 5/00 345/1.3 |
| 2013/0002634 A1 | 1/2013 | Wendler et al. |
| 2013/0027861 A1 | 1/2013 | Rosenau et al. |
| 2013/0182440 A1 | 7/2013 | Ferrie et al. |
| 2013/0200821 A1 | 8/2013 | Yoneoka et al. |
| 2013/0229797 A1 | 9/2013 | Nearman |
| 2013/0271973 A1 | 10/2013 | Rycyna, III |
| 2013/0279161 A1 | 10/2013 | Pickard et al. |
| 2013/0321387 A1 | 12/2013 | Ohe |
| 2014/0085885 A1 | 3/2014 | Hatano |
| 2014/0153241 A1 | 6/2014 | Templeton |
| 2014/0160363 A1 | 6/2014 | Mutschelknaus et al. |
| 2014/0259645 A1* | 9/2014 | Cox et al. .............. 29/726 |
| 2014/0267784 A1 | 9/2014 | Rykowski |
| 2014/0267896 A1 | 9/2014 | Cox et al. |
| 2014/0268565 A1 | 9/2014 | Cox et al. |
| 2014/0285963 A1 | 9/2014 | Vasilevsky |
| 2014/0301088 A1 | 10/2014 | Lu et al. |
| 2015/0145851 A1 | 5/2015 | Takeda et al. |
| 2015/0205565 A1 | 7/2015 | Koguchi |

FOREIGN PATENT DOCUMENTS

| | | |
|---|---|---|
| CN | 2549557 Y | 5/2003 |
| CN | 2646812 Y | 10/2004 |
| CN | 1556516 A | 12/2004 |
| CN | 2674579 Y | 1/2005 |
| CN | 2706836 Y | 6/2005 |
| CN | 2727885 Y | 9/2005 |
| CN | 2733499 Y | 10/2005 |
| CN | 3509179 | 2/2006 |
| CN | 2822095 Y | 9/2006 |
| CN | 2824292 Y | 10/2006 |
| CN | 2834111 Y | 11/2006 |
| CN | 2874691 Y | 2/2007 |
| CN | 2899008 Y | 5/2007 |
| CN | 2906921 Y | 5/2007 |
| CN | 200956227 Y | 10/2007 |
| CN | 101250936 A | 8/2008 |
| CN | 101294700 A | 10/2008 |
| CN | 101334953 A | 12/2008 |

(56) References Cited

FOREIGN PATENT DOCUMENTS

| | | |
|---|---|---|
| CN | 101404316 A | 4/2009 |
| CN | 201226214 Y | 4/2009 |
| CN | 201229746 Y | 4/2009 |
| CN | 201229747 Y | 4/2009 |
| CN | 201233695 Y | 5/2009 |
| CN | 201262959 Y | 6/2009 |
| CN | 201307381 Y | 9/2009 |
| CN | 201345201 Y | 11/2009 |
| CN | 101629707 A | 1/2010 |
| CN | 101699154 A | 4/2010 |
| CN | 201438351 U | 4/2010 |
| CN | 101701674 A | 5/2010 |
| CN | 201449702 | 5/2010 |
| CN | 201449702 U | 5/2010 |
| CN | 201465466 U | 5/2010 |
| CN | 101355132 B | 6/2010 |
| CN | 101737646 A | 6/2010 |
| CN | 101737648 A | 6/2010 |
| CN | 201539725 U | 8/2010 |
| CN | 201540699 | 8/2010 |
| CN | 201550216 U | 8/2010 |
| CN | 101834173 A | 9/2010 |
| CN | 201575434 U | 9/2010 |
| CN | 201576411 U | 9/2010 |
| CN | 201576430 U | 9/2010 |
| CN | 201577260 U | 9/2010 |
| CN | 201584129 U | 9/2010 |
| CN | 101887940 A | 11/2010 |
| CN | 201622789 U | 11/2010 |
| CN | 201651984 U | 11/2010 |
| CN | 201655193 U | 11/2010 |
| CN | 201655196 U | 11/2010 |
| CN | 201681560 U | 12/2010 |
| CN | 101640237 B | 1/2011 |
| CN | 201748196 U | 2/2011 |
| CN | 201748199 U | 2/2011 |
| CN | 101546801 B | 3/2011 |
| CN | 201765771 U | 3/2011 |
| CN | 201796561 U | 4/2011 |
| CN | 201803140 U | 4/2011 |
| CN | 201803144 U | 4/2011 |
| CN | 201804915 U | 4/2011 |
| CN | 201812454 U | 4/2011 |
| CN | 201812456 U | 4/2011 |
| CN | 201838265 U | 5/2011 |
| CN | 201845522 U | 5/2011 |
| CN | 102110764 A | 6/2011 |
| CN | 201868043 U | 6/2011 |
| CN | 201868044 U | 6/2011 |
| CN | 102136229 A | 7/2011 |
| CN | 201904981 U | 7/2011 |
| CN | 201910212 U | 7/2011 |
| CN | 201910213 U | 7/2011 |
| CN | 102163392 A | 8/2011 |
| CN | 102168702 A | 8/2011 |
| CN | 201916876 U | 8/2011 |
| CN | 201918125 U | 8/2011 |
| CN | 201925281 U | 8/2011 |
| CN | 201946238 U | 8/2011 |
| CN | 201954484 U | 8/2011 |
| CN | 201956020 U | 8/2011 |
| CN | 201965586 U | 9/2011 |
| CN | 201965861 U | 9/2011 |
| CN | 201973531 U | 9/2011 |
| CN | 201973623 U | 9/2011 |
| CN | 201975022 U | 9/2011 |
| CN | 201976382 U | 9/2011 |
| CN | 102214783 A | 10/2011 |
| CN | 202012808 U | 10/2011 |
| CN | 202025488 U | 11/2011 |
| CN | 202042136 U | 11/2011 |
| CN | 202049690 U | 11/2011 |
| CN | 202058388 U | 11/2011 |
| CN | 202067478 U | 12/2011 |
| CN | 202084254 U | 12/2011 |
| CN | 102314812 A | 1/2012 |
| CN | 202102651 U | 1/2012 |
| CN | 202134169 U | 2/2012 |
| CN | 102368367 A | 3/2012 |
| CN | 202171165 U | 3/2012 |
| CN | 102418912 A | 4/2012 |
| CN | 202230681 U | 5/2012 |
| CN | 202230682 U | 5/2012 |
| CN | 102509520 A | 6/2012 |
| CN | 202266799 U | 6/2012 |
| CN | 101872828 B | 7/2012 |
| CN | 101872829 B | 7/2012 |
| CN | 102544319 A | 7/2012 |
| CN | 202307009 U | 7/2012 |
| CN | 102623618 A | 8/2012 |
| CN | 102623621 A | 8/2012 |
| CN | 202383944 | 8/2012 |
| CN | 102682669 A | 9/2012 |
| CN | 102682671 A | 9/2012 |
| CN | 202422683 U | 9/2012 |
| CN | 202423377 U | 9/2012 |
| CN | 102737554 A | 10/2012 |
| CN | 102738366 A | 10/2012 |
| CN | 102760392 A | 10/2012 |
| CN | 202502685 U | 10/2012 |
| CN | 101872827 B | 11/2012 |
| CN | 102168702 B | 11/2012 |
| CN | 102800765 A | 11/2012 |
| CN | 202521184 U | 11/2012 |
| CN | 202523329 U | 11/2012 |
| CN | 202523334 U | 11/2012 |
| CN | 202523337 U | 11/2012 |
| CN | 202523345 U | 11/2012 |
| CN | 202523349 U | 11/2012 |
| CN | 202523351 U | 11/2012 |
| CN | 202523374 U | 11/2012 |
| CN | 202523377 U | 11/2012 |
| CN | 202549195 U | 11/2012 |
| CN | 202563838 U | 11/2012 |
| CN | 202581065 U | 12/2012 |
| CN | 202584617 U | 12/2012 |
| CN | 202584622 U | 12/2012 |
| CN | 202584625 U | 12/2012 |
| CN | 202601717 U | 12/2012 |
| CN | 202602105 U | 12/2012 |
| CN | 202615728 U | 12/2012 |
| CN | 202632682 U | 12/2012 |
| CN | 202646254 U | 1/2013 |
| CN | 202650452 U | 1/2013 |
| CN | 202650463 U | 1/2013 |
| CN | 202656470 U | 1/2013 |
| CN | 202677752 U | 1/2013 |
| CN | 202677753 U | 1/2013 |
| CN | 202679828 U | 1/2013 |
| CN | 202691652 U | 1/2013 |
| CN | 202707716 U | 1/2013 |
| CN | 202713825 U | 1/2013 |
| CN | 302301505 S | 1/2013 |
| CN | 302301906 S | 1/2013 |
| CN | 101740706 B | 2/2013 |
| CN | 102185078 B | 2/2013 |
| CN | 102930785 A | 2/2013 |
| CN | 202721932 U | 2/2013 |
| CN | 202736970 U | 2/2013 |
| CN | 202743586 U | 2/2013 |
| CN | 202758554 U | 2/2013 |
| CN | 202758555 U | 2/2013 |
| CN | 102163392 B | 3/2013 |
| CN | 103000088 A | 3/2013 |
| CN | 202795924 U | 3/2013 |
| CN | 202816279 U | 3/2013 |
| CN | 202838846 U | 3/2013 |
| CN | 103022318 A | 4/2013 |
| CN | 103065559 A | 4/2013 |
| CN | 202855217 U | 4/2013 |
| CN | 202887627 U | 4/2013 |
| CN | 202905030 U | 4/2013 |
| CN | 202905033 U | 4/2013 |
| CN | 202905040 U | 4/2013 |

(56) References Cited

FOREIGN PATENT DOCUMENTS

| | | |
|---|---|---|
| CN | 202905058 U | 4/2013 |
| CN | 302417520 S | 4/2013 |
| CN | 302417587 S | 4/2013 |
| CN | 103124483 A | 5/2013 |
| CN | 101976720 B | 6/2013 |
| CN | 103177664 A | 6/2013 |
| CN | 103177665 A | 6/2013 |
| CN | 202976707 U | 6/2013 |
| CN | 101894898 B | 7/2013 |
| CN | 103196051 A | 7/2013 |
| CN | 203038588 U | 7/2013 |
| CN | 203038597 U | 7/2013 |
| CN | 203038598 U | 7/2013 |
| CN | 203038599 U | 7/2013 |
| CN | 203055361 U | 7/2013 |
| CN | 203055365 U | 7/2013 |
| CN | 203102774 U | 7/2013 |
| CN | 203102775 U | 7/2013 |
| CN | 103268738 A | 8/2013 |
| CN | 203136407 U | 8/2013 |
| CN | 203165372 U | 8/2013 |
| CN | 103280164 A | 9/2013 |
| CN | 203176910 U | 9/2013 |
| CN | 203192335 U | 9/2013 |
| CN | 203202526 U | 9/2013 |
| CN | 203231179 U | 9/2013 |
| CN | 103346238 A | 10/2013 |
| CN | 103354067 A | 10/2013 |
| CN | 203232680 U | 10/2013 |
| CN | 203240341 U | 10/2013 |
| CN | 203242660 U | 10/2013 |
| CN | 203250487 U | 10/2013 |
| CN | 203250491 U | 10/2013 |
| CN | 302600355 S | 10/2013 |
| CN | 302607812 S | 10/2013 |
| CN | 302607814 S | 10/2013 |
| CN | 103413497 A | 11/2013 |
| CN | 103456244 A | 12/2013 |
| CN | 103456247 A | 12/2013 |
| CN | 203325368 U | 12/2013 |
| CN | 203336167 U | 12/2013 |
| CN | 203339216 U | 12/2013 |
| CN | 203339217 U | 12/2013 |
| CN | 302682535 S | 12/2013 |
| CN | 102682669 B | 1/2014 |
| CN | 203386338 U | 1/2014 |
| CN | 203415183 U | 1/2014 |
| CN | 302705434 S | 1/2014 |
| CN | 302716898 S | 1/2014 |
| CN | 302716899 S | 1/2014 |
| CN | 203490915 U | 3/2014 |
| CN | 203491298 U | 3/2014 |
| CN | 203491299 U | 3/2014 |
| CN | 302761262 S | 3/2014 |
| CN | 302761263 S | 3/2014 |
| CN | 103730068 A | 4/2014 |
| CN | 203526759 U | 4/2014 |
| CN | 203528543 U | 4/2014 |
| CN | 203535913 U | 4/2014 |
| CN | 203571647 U | 4/2014 |
| CN | 203571663 U | 4/2014 |
| CN | 203573584 U | 4/2014 |
| CN | 203573585 U | 4/2014 |
| CN | 203573586 U | 4/2014 |
| CN | 203573592 U | 4/2014 |
| CN | 302789638 S | 4/2014 |
| CN | 302790357 S | 4/2014 |
| CN | 302790361 S | 4/2014 |
| CN | 203606693 U | 5/2014 |
| CN | 203607042 U | 5/2014 |
| CN | 203607050 U | 5/2014 |
| CN | 203631082 U | 6/2014 |
| CN | 203644330 U | 6/2014 |
| CN | 103956136 A | 7/2014 |
| CN | 203690339 U | 7/2014 |
| CN | 203743962 U | 7/2014 |
| CN | 302864854 S | 7/2014 |
| CN | 104009145 A | 8/2014 |
| CN | 104009146 A | 8/2014 |
| CN | 203787033 U | 8/2014 |
| CN | 302917815 S | 8/2014 |
| CN | 203849976 U | 9/2014 |
| CN | 203910233 U | 10/2014 |
| CN | 203932101 U | 11/2014 |
| CN | 203950801 U | 11/2014 |
| CN | 203950834 U | 11/2014 |
| CN | 204005499 U | 12/2014 |
| CN | 204117521 U | 1/2015 |
| CN | 204117522 U | 1/2015 |
| CN | 303084137 S | 1/2015 |
| CN | 303084275 S | 1/2015 |
| CN | 204141352 U | 2/2015 |
| CN | 204143784 U | 2/2015 |
| CN | 204229808 U | 3/2015 |
| CN | 102814429 B | 4/2015 |
| CN | 204257141 U | 4/2015 |
| CN | 204285400 U | 4/2015 |
| CN | 204288709 U | 4/2015 |
| CN | 303169413 S | 4/2015 |
| CN | 303169414 S | 4/2015 |
| CN | 303169875 S | 4/2015 |
| CN | 303170948 S | 4/2015 |
| CN | 303227404 S | 5/2015 |
| CN | 204423826 U | 6/2015 |
| CN | 103022318 B | 7/2015 |
| CN | 204463732 U | 7/2015 |
| CN | 204496855 U | 7/2015 |
| CN | 303276898 S | 7/2015 |
| CN | 303278324 S | 7/2015 |
| CN | 204534276 U | 8/2015 |
| CN | 303316383 S | 8/2015 |
| CN | 303339773 S | 8/2015 |
| CN | 303339774 S | 8/2015 |
| CN | 103032767 B | 9/2015 |
| CN | 103337224 B | 9/2015 |
| CN | 204613541 U | 9/2015 |
| CN | 204634223 U | 9/2015 |
| CN | 204665178 U | 9/2015 |
| CN | 103544896 B | 10/2015 |
| CN | 103557498 B | 10/2015 |
| CN | 204695705 U | 10/2015 |
| CN | 303405173 S | 10/2015 |
| CN | 103280164 B | 2/2016 |
| CN | 103456244 B | 2/2016 |
| CN | 105447283 A | 3/2016 |
| CN | 103367612 B | 4/2016 |
| CN | 103219447 B | 5/2016 |
| CN | 105632354 A | 6/2016 |
| CN | 205406020 U | 7/2016 |
| CN | 205406022 U | 7/2016 |
| CN | 205408340 U | 7/2016 |
| CN | 303746225 S | 7/2016 |
| CN | 103337583 B | 8/2016 |
| CN | 103441209 B | 8/2016 |
| CN | 103794702 B | 8/2016 |
| CN | 205447200 U | 8/2016 |
| CN | 205487176 U | 8/2016 |
| CN | 205487177 U | 8/2016 |
| CN | 303776642 S | 8/2016 |
| CN | 303805061 S | 8/2016 |
| CN | 205555209 U | 9/2016 |
| CN | 104143315 B | 11/2016 |
| CN | 103730563 B | 4/2017 |
| CN | 304222223 S | 7/2017 |
| CN | 103472817 B | 12/2017 |
| EP | 0863496 A2 | 9/1998 |
| EP | 863496 A2 | 9/1998 |
| EP | 1469450 A1 | 10/2004 |
| EP | 2956925 A1 | 12/2015 |
| GB | 1585394 A | 3/1981 |
| JP | 06337644 A | 12/1994 |
| JP | 0816114 A | 1/1996 |
| JP | 1138905 A | 2/1999 |
| JP | 1152878 A | 2/1999 |

(56) References Cited

FOREIGN PATENT DOCUMENTS

| | | |
|---|---|---|
| JP | 2001242796 A | 9/2001 |
| JP | 2001337626 A | 12/2001 |
| JP | 2002368284 A | 12/2002 |
| JP | 2003092195 A | 3/2003 |
| JP | 2004354571 A | 12/2004 |
| JP | 2005062461 A | 3/2005 |
| JP | 2005084683 A | 3/2005 |
| JP | 2006023464 A | 1/2006 |
| JP | 2006221067 A | 8/2006 |
| JP | 2007533066 A | 11/2007 |
| JP | 2010181721 A | 8/2010 |
| KR | 20020069818 A | 9/2002 |
| WO | 0223956 A2 | 3/2002 |
| WO | 2004019657 A2 | 3/2004 |
| WO | 2004042690 A1 | 5/2004 |
| WO | 2005083660 | 9/2005 |
| WO | 2005103564 A1 | 11/2005 |
| WO | 2007061496 A2 | 5/2007 |
| WO | 2007083879 A1 | 7/2007 |
| WO | 2008157262 A2 | 12/2008 |
| WO | 2009000896 A2 | 12/2008 |
| WO | 2011062570 A1 | 5/2011 |
| WO | 2013159655 A1 | 10/2013 |
| WO | 2014005600 | 1/2014 |
| WO | 2015103079 A1 | 7/2015 |

OTHER PUBLICATIONS

Daktronics, "Daktronics LED Billboard Technology," www.daktronics.com Nov. 14, 2013, 3 pages.

EKTA, "WOWStrip," www.ekta-led.com, Jun. 19, 2014, 5 pages.

"What is IP? Explained: Ingress Protection rating (IP Rating, IP65-IP68) system," Waterproof TVs Direct; Apr. 11, 2012; http://waterproftvs-direct.co.uk/blog/waterproof-tv/what-is-ip-ip-explained-ingress-protection-rating-ip-rating-ip65-ip68-system.

WOWstrip Semi-Transparent LED Displays product page, http://www.ekta-led.com/prod/68/17/190/, retrieved Jun. 19, 2014, 3 pages.

UK Intellectual Property Office, Search Report in Application No. GB1518912.9, dated Mar. 2, 2016, pp. 1-6.

Lang, Justin, Buyers Guide, "LED Display Panels," PLSN.com, Nov. 2013, 2 pages.

Internet Archive Wayback Machine, "Outdoor/Indoor LED Display, LED Screen, LED Panel, LED Video Wall, LED Curtain, LED Strip," https://web.archive.org/web/20130728075831/http://www.szaoto.com:80/product1.html, Jul. 2013, 2 pages.

Internet Archive Wayback Machine, "AOTO M Series Rental LED Display," https://web.archive.org/web/20111211101926/http://www.szaoto.com:80/product13.html, Dec. 11, 2011, 1 page.

Internet Archive Wayback Machine, "AOTO M Series Rental LED Display," https://web.archive.org/web/20130909053329/http://szaoto.com:80/product13.html, Sep. 2013, 1 page.

LighthouseLED, "Possibilities" and "Specifications," Aug. 9, 2013, 1 page.

Samsung, "User Manual, UD22B," B146-00286A-02, Jul. 2012, 145 pages.

Prismview, A Samsung Electronics Company, "Deploying a Digital Billboard with Prismview, Steps from Contracting Through Installation," White Paper, Aug. 2012, 4 pages.

YESCO Electronics, "The Layered Service Approach for Digital Outdoor Displays," White Paper, YESCO Electronics Service Plans, Aug. 2012, 6 pages.

Lighthouse Create Impact, "10mm Visual Resolution with Oval LEDs, Bi10-ER, Large Scale LED Panel, A Modular System for Outdoor Applications," Operation Manual, Jul. 2011; Document version 1.3; 33 pages.

English Translation of Previously cited CN 203607050U, Published on May 21, 2014, Shenzhen Aoto Electronics Co., Ltd., 6 pages.

ACC Silicones, "Clear Silicone Gel," https://web.archive.org/web/20140622080139/https://www.acc-silicones.com/products/gels.ashx, Jun. 22, 2014, 4 pages.

AOTO, Article "AOTO Launches World Highest Resolution Outdoor LED Display—M8 in ISE 2012," http://en.aoto.com/article/detail/201705111014.html, 2012, 3 pages.

Internet Archive Wayback Machine, "AOTO Launches Worl s Highest-Resolution M3 LED Display in ISE," https://www.szaoto.com:80/news_23.html, Dec. 11, 2011, 1 page.

Glux, "BAtn Series," www.glux.com.cn/en, 2013, 2 pages.

"C-5 Rental Display," Installation Manual, Nov. 15, 2011, R5905120, 80 pages.

Li Yan, et al., "Potting Process Design of Outdoor LED Display Module," CKNI, Dec. 31, 2006, 1 page.

Luminautics, "LED Display Primer," www.luminautisc.com, 2011, 21 pages.

Internet Archive Wayback Machine, AOTO M Series Rental LED Display, "M Series Rental LED Display," https://web.archive.org/web/20111211101926/http://www.szaoto.com:80/product13, Dec. 11, 2011, 1 page.

Internet Archive Wayback Machine, AOTO, "News Center," http://szaoto.com/news.html, Dec. 7, 2013, 2013, 3 pages.

OSRAM Opto Semiconductors, "Outdoor Capability of Silicone SMT LEDs used in LED Sign Board Applications," Jan. 31, 2004, 17 pages.

Barco, "Outdoor LED Display Solutions," SLite, www.barco.com, Apr. 2007, 4 pages.

Glux, "SEfl Series," www.glux.com.cn, 2013, 1 page.

Sony, "Large LED Display System," 2011, 8 pages.

Vuepix, Product Catalog, 2012, www.vuepix.com, 36 pages.

Yung, K.C., et al., "Thermal Performance of High Brightness LED Array Package on PCB," Nov. 30, 2010, 2 pages.

Barco, "LED Display Systems," LiveDots Product Catalog 2011, http://web.archive.org/web/20120318082027/http:/www.barco.com/Downloads/liveDots/LED_Product_Catalog.pdf, Mar. 18, 2012, 28 pages.

Barco, C11 "Lightweight, Indoor/Outdoor LED Video Display," http://web.archive.org/web/20100526031644/http:/www.barco.com:80/en/product/2258/specs, May 26, 2010, 1 page.

Xavier, Dominic Michael, "Development of a Large Scale Flexible LED Display Matrix for the Screen Industry," Thesis, Faculty of Built Environment and Engineering, Queensland University of Technology, Feb. 2013, 543 pages.

"Petitioner for Inter Partes Review," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC,* United States Patent and Trademark Office, Before the Patent Trial and Appeal Board , U.S. Pat. No. 9,349,306, Case No. IPR2019-00347, Nov. 20, 2018, 90 pages.

Petitioner Shenzhen AOTO Electronics Co., Ltd.,"Petitioner's Power of Attorney," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC,* United States Patent and Trademark Office, Before the Patent Trial and Appeal Board , Inter Partes Review of U.S. Pat. No. 9,349,306, Case No. IPR2019-00347, Nov. 20, 2018, 3 pages.

Petitioner Ledman Optoelectronic Co., Ltd., "Petitioner's Power of Attorney," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC,* United States Patent and Trademark Office, Before the Patent Trial and Appeal Board , Inter Partes Review of U.S. Pat. No. 9,349,306, Case No. IPR2019-00347, Nov. 20, 2018, 3 pages.

Petitioner Leyard Optoelectronic Co., "Petitioner's Power of Attorney," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC,* United States Patent and Trademark Office, Before the Patent Trial and Appeal Board , Inter Partes Review of U.S. Pat. No. 9,349,306, Case No. IPR2019-00347, Nov. 20, 2018, 3 pages.

Petitioner Shenzhen Liantronics Co., "Petitioner's Power of Attorney," RE: *Shenzhen AOTO Electronics Co., Ltd.; Leyard Optoelectronic*

(56) References Cited

OTHER PUBLICATIONS

Co.; Shenzhen Liantronics Co., Ltd.; Unilumin Group Co., Ltd.; Yaham Optoelectronics Co., Ltd.; and Ledman Optoelectronic Co., Ltd. Vs *Ultravision Technologies, LLC*, United States Patent and Trademark Office, Before the Patent Trial and Appeal Board, Inter Partes Review of U.S. Pat. No. 9,349,306, Case No. IPR2019-00347, Nov. 20, 2018, 3 pages.

Petitioner Unilumin Group Co. Ltd., "Petitioner's Power of Attorney," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, Inter Partes Review of U.S. Pat. No. 9,349,306, Case No. IPR2019-00347, Nov. 20, 2018, 3 pages.

Petitioner Yaham Optoelectronics Co. Ltd., "Petitioner's Power of Attorney," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, Inter Partes Review of U.S. Pat. No. 9,349,306, Case No. IPR2019-00347, Nov. 20, 2018, 3 pages.

"Exhibit 1001, U.S. Pat. No. 9,349,306 B2" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 83 pages.

"Exhibit 1002, Declaration of Mike Wood," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 90 pages.

"Exhibit 1004, U.S. Pat. No. 9,349,306" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 5pp. 1-337.

"Exhibit 1004, U.S. Pat. No. 9,349,306" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 338-594.

"Exhibit 1005, U.S. Pat. No. 9,134,773" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 1-218.

"Exhibit 1005, U.S. Pat. No. 9,134,773" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 219-426.

"Exhibit 1005, U.S. Pat. No. 9,134,773" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 427-546.

"Exhibit 1006, US 2013/0271973 A1" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 62 pages.

"Exhibit 1007, US 2006/0227003 A1" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 11 pages.

"Exhibit 1008, CN 201449702 U" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 19 pages.

"Exhibit 1009, US 2007/0247842 A1" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 35 pages.

"Exhibit 1010, US 2005/0116667 A1" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 112 pages.

"Exhibit 1011, Joint Claim Construction Chart" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 19 pages.

"Exhibit 1012, Whats What Happens, 2008 LED Signs" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, 20 pages.

"Exhibit 1013, U.S. Pat. No. 9,916,782" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 1-209.

"Exhibit 1013, U.S. Pat. No. 9,916,782" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 210-426.

"Exhibit 1013, U.S. Pat. No. 9,916,782" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board, U.S. Pat. No. 9,349,306, Case No. IPR2019-00347, Nov. 20, 2018, pp. 427-616.

(56) References Cited

OTHER PUBLICATIONS

"Exhibit 1032, Direct Current Definition," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Exhibit 1033, Alternating Current Definition," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Exhibit 1036, What We Do, International Electrotechnical Commission" RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 1 page.
"Exhibit 1040, US 2007/0263381 A1," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 9 pages.
"Exhibit 1041, What is an IP Rating?—Progressive Automations Inc.," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 23 pages.
"Exhibit 1042, LED Display Solutions," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 24 pages.
"Exhibit 1043, LED Video Displays," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Exhibit 1044, LED Display Panels by Justin Lang," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Exhibit 1045, IPx6 Rated Surface Mount LED," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Exhibit 1046, Bi-Weekly Declaration Regarding Asserted Claims," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co.,*
*Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 6 pages.
"Exhibit 1047, Xin Min Liu Certification of Translation," RE: *Shenzhen AOTO Electronics Co., Ltd.; Leyard Optoelectronic Co.; Shenzhen Liantronics Co., Ltd.; Unilumin Group Co., Ltd.; Yaham Optoelectronics Co., Ltd.; and Ledman Optoelectronic Co., Ltd.* Vs *Ultravision Technologies, LLC*, United States Patent and Trademark Office, Before the Patent Trial and Appeal Board , U.S. Pat. No. 9,349,306, Case No. IPR2019-00347, Nov. 20, 2018, 2 pages.
"Respondents' Identification of Claim Terms Requiring Constructions," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Jul. 26, 2018, 10 pages.
"Complainant Ultravision Technologies, LLC's List of Claim Terms to be Construed," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Jul. 26, 2018, 9 pages.
"Respondents' Identification of Disputed Claim Terms and Proposed Construction," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Aug. 14, 2018, 20 pages.
"Complainant Ultravision Technologies, LLC's Proposed Claim Construction and Supporting Evidence," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Aug. 14, 2018, 22 pages.
"Respondents' Notice of Prior Art," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Sep. 10, 2018, 10 pages.
"Exhibit A—Respondents' Notice of Prior Art (Prior Art Publications)," RE: Certain Modular LED Display Panels and Components Thereof, *Ultravision Technologies, Inc.* v. *Adduci, Mastriani and Schaumberg, L.L.P.*, United States International Trade Commission, ITC Inv. No. 337-TA-1114, Sep. 10, 2018, 26 pages.
"Exhibit B—Respondents' Notice of Prior Art (Prior Art Products)," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Sep. 10, 2018, 9 pages.
"Commission Investigative Staff's Notice of Prior Art," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Sep. 10, 2018, 8 pages.
"Respondents' Combined Supplemental Responses to Opening Contention Interrogatories," RE: Certain Modular LED Display Panels and Components Thereof, *Ultravision Technologies, Inc.* v. *Adduci, Mastriani and Schaumberg, L.L.P.*, United States International Trade Commission, Investigative No. 337-TA-1114, Sep. 21, 2018, 35 pages.
"Exhibit 4 of Respondents' Combined Supplemental Responses to Opening Contention Interrogatories" RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Sep. 21, 2018, 44 pages.
"Exhibit 5 of Respondents' Combined Supplemental Responses to Opening Contention Interrogatories," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Sep. 21, 2018, 19 pages.

(56) References Cited

OTHER PUBLICATIONS

"Exhibit 7 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 22 pages.

"Exhibit 8 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 51 pages.

"Exhibit 9 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 20 pages.

"Exhibit 10 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 35 pages.

"Exhibit 11 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 24 pages.

"Exhibit 13 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 24 pages.

"Exhibit 14 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 34 pages.

"Exhibit 15 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 48 pages.

"Exhibit 17 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, pp. 1-29.

"Exhibit 17 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, pp. 30-58.

"Exhibit 24 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 40 pages.

"Exhibit 25 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 54 pages.

"Exhibit 26 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 42 pages.

"Exhibit 27 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 41 pages.

"Exhibit 28 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 29 pages.

"Exhibit 29 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 29 pages.

"Exhibit 30 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 44 pages.

"Exhibit 33 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 50 pages.

"Exhibit 34 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 13 pages.

"Exhibit 40 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 93 pages.

"Exhibit 41 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 223 pages.

"Exhibit 42 of Respondents' Combined Supplemental Responses to Opening Contention Interrogatories," RE: *Certain Modular LED Display Panels and components Thereof, Ultravision Technologies, Inc. v. Adduci, Mastriani and Schaumberg, L.L.P.*, United States International Trade Commission, IITC Inv. No. 337-TA-1114, Sep. 21, 2018, 433 pages.

"Exhibit 44 of Respondents' Combined Supplemental Responses to Opening Contention Interrogatories," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Sep. 21, 2018, 28 pages.

"Exhibit 45 of Respondents' Combined Supplemental Responses to Opening Contention Interrogatories," RE: Certain Modular LED Display Panels and Components Thereof, *Ultravision Technologies,*

(56) References Cited

OTHER PUBLICATIONS

*Inc.* v. *Adduci, Mastriani and Schaumberg, L.L.P.*, United States International Trade Commission, IITC Inv. No. 337-TA-1114, Sep. 21, 2018, 31 pages.
"Exhibit 46 of Respondents' Combined Supplemental Responses to Opening Contention Interrogatories," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Sep. 21, 2018, 31 pages.
"Respondents' Motion for Leave to Amend and Assert Additional Defenses that the Patents are Unenforceable for Inequitable Conduct, Patent Misuse, Unclean Hands, and/or Improper Inventorship" RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Oct. 11, 2018, 30 pages.
"Respondents' Motion for Leave to Supplement the Invalidity Contentions Based on Information Recently Received," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Oct. 23, 2018, 12 pages.
"Declaration of Patrick J. Mccarthy in Support of Respondents' Motion for Leave to Supplement the Invalidity Contentions Based on Information Recently Received," RE: Certain Modular LED Display Panels and Components Thereof, *Ultravision Technologies, Inc.* v. *Adduci, Mastriani and Schaumberg, L.L.P.*, United States International Trade commission, IITC Inv. No. 337-TA-1114, Oct. 23, 2018, 2 pages.
"Exhibit 1 of Motion for Leave to Supplement the Invalidity Contentions Based on Information Recently Received," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Oct. 23, 2018, 20 pages.
"Exhibit 2 of Motion for Leave to Supplement the Invalidity Contentions Based on Information Recently Received," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Oct. 23, 2018, 3 pages.
"Exhibit 3 of Motion for Leave to Supplement the Invalidity Contentions Based on Information Recently Received," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Oct. 23, 2018, 36 pages.
"Ultravision's Opposition to Respondents' Motion for Leave to Amend and Assert Additional Defenses that the Patents are Unenforceable for Inequitable Conduct, Patent Misuse, Unclean Hands, and/or Improper Inventorship" RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Nov. 5, 2018, 20 pages.
"Complaint," RE: Certain Light Engines and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 96 pages.
"Exhibit 5 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 4 pages.
"Exhibit 6 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 72 pages.
"Exhibit 7 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 53 pages.
"Exhibit 8 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 26 pages.
"Exhibit 9 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 44 pages.
"Exhibit 10 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 32 pages.
"Exhibit 11 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 32 pages.
"Exhibit 12 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 37 pages.
"Exhibit 13 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 42 pages.
"Exhibit 14 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 45 pages.
"Exhibit 15 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 41 pages.
"Exhibit 16 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 51 pages.
"Exhibit 17 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 46 pages.
"Exhibit 18 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 50 pages.
"Exhibit 19 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 26 pages.
"Exhibit 20 of Complaint," RE: Certain Modular LED Display Panels and Components Thereof, *Ultravision Technologies, Inc.* v. *Adduci, Mastriani and Schaumberg, L.L.P.*, United States International Trade Commission, IITC Inv. No. 337-TA-1114, Mar. 27, 2018, 35 pages.
"Exhibit 21 of Complaint," RE: Certain Modular LED Display Panels and Components Thereof, *Ultravision Technologies, Inc.* v.

(56) References Cited

OTHER PUBLICATIONS

*Adduci, Mastriani and Schaumberg, L.L.P.*, United States International Trade Commission, IITC Inv. No. 337-TA-1114, Mar. 27, 2018, 38 pages.
"Exhibit 22 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 50 pages.
"Exhibit 23 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 52 pages.
"Exhibit 24 of Complaint," RE: *Certain Modular LED Display Panels and Components Thereof, Ultravision Technologies, Inc. v. Adduci, Mastriani and Schaumberg, L.L.P.*, United States International Trade Commission, IITC Inv. No. 337-TA-1114, Mar. 27, 2018, 33 pages.
"Exhibit 25 of Complaint," RE: *Certain Modular LED Display Panels and Components Thereof, Ultravision Technologies, Inc. v. Adduci, Mastriani and Schaumberg, L.L.P.*, United States International Trade Commission, IITC Inv. No. 337-TA-1114, Mar. 27, 2018, 32 pages.
"Exhibit 26 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 38 pages.
"Exhibit 27 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 14 pages.
"Exhibit 28 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 27 pages.
"Exhibit 29 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 16 pages.
"Exhibit 30 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 14 pages.
"Exhibit 31 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 14 pages.
"Exhibit 32 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 18 pages.
"Exhibit 33 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 15 pages.
"Exhibit 34 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 18 pages.
"Exhibit 35 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 18 pages.
"Exhibit 36 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 17 pages.
"Exhibit 37 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 18 pages.
"Exhibit 38 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 13 pages.
"Exhibit 39 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 14 pages.
"Exhibit 40 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 16 pages.
"Exhibit 41 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 20 pages.
"Exhibit 42 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 37 pages.
"Exhibit 43 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 14 pages.
"Exhibit 44 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 50 pages.
"Exhibit 45 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 36 pages.
"Exhibit 46 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 5 pages.
"Exhibit 47 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 29 pages.
"Exhibit 48 of Complaint," RE: Certain Modular LED Display Panels and Components Thereof, *Ultravision Technologies, Inc. v. Adduci, Mastriani and Schaumberg, L.L.P.*, United States International Trade Commission, IITC Inv. No. 337-TA-1114, Mar. 27, 2018, 4 pages.
"Exhibit 49 of Complaint," RE: Certain Modular LED Display Panels and Components Thereof, *Ultravision Technologies, Inc. v.

(56) References Cited

OTHER PUBLICATIONS

*Adduci, Mastriani and Schaumberg, L.L.P.*, United States International Trade Commission, IITC Inv. No. 337-TA-1114, Mar. 27, 2018, 8 pages.
Cirrus LED Systems, Internet Archive Wayback Machine, "The N2 System Setup & Installation Zero Lead Time," Outdoor LED Displays—Cirrus LED Systems, https://web.archive.org/web/20131228140224/http://cirrusled.com/, Dec. 28, 2013, 4 Pages.
Cirrus LED Systems, Internet Archive Wayback Machine, "Introducing N2 System Innovative Outdoor LED Display Solution from Cirrus," LED Panels, N2 System—Cirrus LED System, https://web.archive.org/web/20130921080129/http://www.cirrusled.com/products/n2-system Sep. 21, 2013, 3 Pages.
Cirrus LED, Internet Archive Wayback Machine, "Nubis System the Next Generation Reinventing the LED Display," LED Outdoor Display Signs, Electronic Digital Message Sign Billboards, LED Displays Manufacturer, https://web.archive.org/web/20120213172356/http://www.cirrusled.com:80/, Feb. 13, 2012, 1 Page.
Cirrus N2 LED Displays, Internet Archive Wayback Machine, "LED Panels," Martin Supply Company Inc., https://web.archive.org/web/20130916051706/http://martin-supply.com/category/nubis, Sep. 16, 2013, 2 Pages.
Cirrus LED Systems, Internet Archive Wayback Machine, "The Next Generation of LED Display," Outdoor LED Displays—Cirrus LED Systems, https://web.archive.org/web/20130830230540/http://www.cirrusled.com/, Aug. 30, 2013, 2 pages.
Cirrus LED Systems, Internet Archive Wayback Machine, "N2-19C," 19mm Pixel Pitch LED Sign—Cirrus LED Systems, https://web.archive.org/web/20130921075058/http://www.cirrusled.com/products/n2-system/full-color-rgb/19mm-pixel-pitch-led-sign, Sep. 21, 2013, 2 Pages.
Cirrus Systems, "N2 LED Display System Video," Published on Youtube on Jul. 24, 2013, 62 Pages.
Serial No. EP14875899.8, filed Sep. 18, 2015, pp. 1-59.
Serial No. EP14875899.8, filed Sep. 18, 2015, pp. 60-107.
Serial No. EP14875899.8, filed Sep. 18, 2015, pp. 108-160.
Serial No. EP14875899.8, filed Sep. 18, 2015, pp. 161-222.
Serial No. EP14875899.8, filed Sep. 18, 2015, pp. 223-280.
Serial No. EP14875899.8, filed Sep. 18, 2015, pp. 281-340.
Serial No. EP14875899.8, filed Sep. 18, 2015, pp. 341-405.
Serial No. EP14875899.8, filed Sep. 18, 2015, pp. 406-468.
Serial No. EP14875899.8, filed Sep. 18, 2015, pp. 469-536.
Serial No. EP14875899.8, filed Sep. 18, 2015, pp. 537-595.
Serial No. EP14875899.8, filed Sep. 18, 2015, pp. 596-666.
Serial No. EP14875899.8, filed Sep. 18, 2015, pp. 667-723.
Serial No. EP14875899.8, filed Sep. 18, 2015, pp. 724-787.
Serial No. EP14875899.8, filed Sep. 18, 2015, pp. 788-852.
Serial No. EP14875899.8, filed Sep. 18, 2015, pp. 853-936.
Serial No. EP14875899.8, filed Sep. 18, 2015, pp. 937-998.
Serial No. EP14875899.8, filed Sep. 18, 2015, pp. 999-1049.
Serial No. EP14875899.8, filed Sep. 18, 2015, pp. 1050-1106.
Serial No. EP14875899.8, filed Sep. 18, 2015, pp. 1107-1151.
Serial No. EP14875899.8, filed Sep. 18, 2015, pp. 1152-1216.
Serial No. EP14875899.8, filed Sep. 18, 2015, pp. 1217-1285.
Serial No. EP14875899.8, filed Sep. 18, 2015, p. 1286.
LED,"New Fully IP-65 Rated Indoor/Outdoor LED Display From PixLED," The Global Information Hub for Lighting Technologies, Products, Materials & Tools, Jan. 25, 2012, pp. 1114-ITC0009457-1114-ITC0009463.
Media Planet, "Digital Place-Based Media," Apr. 2010, No. 3, pp. 1114-11C0009079-1114-ITC0009084.
NEMA, "Degrees of Protection Provided by Enclosures (IP Code)," Ansi/IEC 60529-2004 (R2011), NEMA Standards Publication,Nov. 3, 2004, pp. ITC-001872-ITC-001928.
Nichia Corporation, "Nichia Releases SMD LED for Outdoor Displays," LIGHTimes Online—LED Industry News, LED Applications, Single and Multi-Chip Packaged LEDs, Jun. 18, 2012, pp. 1114-ITC0009464-1114-ITC0009466.

Barco, Inc., "C11 Lightweight, indoor/outdoor LED video display," company website product technical specification sheet, M00360-R02-0111-DS Jan. 2011, 2 pages, Kortrijk, Belgium.
Barco, Inc., "C8," company website product specification sheet, Dec. 16, 2015, 3 pages.
Barco, Inc., "Barco LiveDots adds new member to its C-series LED display family," company website news press release, Apr. 8, 2013, 3 pages, Kortrijk, Belgium.
"DC-DC Converter Tutorial," Maxim Integrated, Tutorial 2031, Nov. 29, 2001, 14 Pages.
"4100 Series Digital Billboard," Installation Manual, Daktronics, DD1914625, Sep. 4, 2011, 51 pages.
"4100 Series Digital Billboard," Daktronics Service Manual, DD1922557, Jan. 4, 2012, 37 pages.
"Barco LiveDots Introduces 14mm Transparent LED Display," Light Sound Journal.com, Jun. 7, 2013, 2 pages.
"Building a DC-DC Power Supply that Works," Maxim Integrated, Tutorial 1897, Sep. 22, 2010, 10 pages.
"Element Labs Introduces Revolutionary Cobra TM Technology Platform," LEDs Magazine, Oct. 24, 2008, 3 pages.
"How to Apply the Acrylic Conformal Coating," MG Chemicals, Mar. 29, 2011, pp. 1-3, Ver. 1.
"Avago Technologies Introduces Industry's First Water Resistant High-Brightness Surface Mount Tricolor LEDs," LED, The Global Information Hub for Lighting Technologies, Products, Materials and Tools, Jan. 28, 2010 7 Pages.
Hu, Run, et al. "Study on the Optical Properties of Conformal Coating Light-Emitting Diode by monte Carlo Simulation," IEEE Photonics technology Letter, Nov. 15, 2011, vol. 23, No. 22, pp. 1673-1675.
LED Industry News, "Multimedia Farms Selects Barco for Portable LED Display Solutions," LIGHTimes Online—LED Industry News, Aug. 3, 2010, pp. 1114-ITC0009454-1114-ITC0009456.
Nichia Corporation, "Nichia Releases SMS LED for Outdoor Displays," LIGHTimes Online—LED Industry News, LED Applications, Single and Multi-Chip Packaged LEDs, Jun. 18, 2012, pp. 1114-ITC0009464-1114-ITC0009466.
Lang, Justin, "LED Display Panels," Buyers Guide, Nov. 2013, pp. 47-49, plsn.com.
Barco, Inc., "PXL System User Manual," Revised Jun. 15, 2010, 196 pages.
Barco, Inc., "Say hello to our brand-new C8 LED display!," company website news release, Apr. 8, 2013, 3 pages.
Cheng, Ting et al., "Thermal analysis and optimization of multiple LED packaging based on a general analytical solution," International Journal of Thermal Sciences 49 (2010), pp. 196-201, Elsevier.
Sturm, James C., et al., "Thermal Effects and Scaling in Organic Light-Emitting FLat-Panel Displays," Invited Paper, IEEE Journal of Selected Topics in Quantum Electronics, vol. 4, No. 1, Jan./Feb. 1998, pp. 75-82.
Hughes, Tom, "Understanding Outdoor LED Electronic Signs," Technology Report, Jul. 20, 2001, 20 pages, 9711-6007, Adaptive Micro Systems, Inc.
Waterfire Signs, "Watch What Happens—2008 LED Signs," marketing brochure, Copyright 2007, 20 pages, Time-O-Matic, Danville, Illinois, USA.
PLSN, "Lighting More Than the Torch," Projection, Lights & Staging News, PLSN New Product Guide, p. 22, www.plsn.com, Sep. 2008, Vik, 9.8, pp. 1114-ITC0000408-1114-ITC0000479.
PLSN, "Backfield Scramble at Mile High Stadium," Projection, Lights & Staging News, Road Test: Vectorworks Spotlight 2009, p. 70, www.plsn.com, Oct. 2008, vol. 9.9, pp. 1114-ITC0000304-1114-ITC0000355.
PLSN, "Backfield Scramble at Mile High Stadium," Projection, Lights & Staging News, Road Test: Vectorworks Spotlight 2009, p. 70, www.plsn.com, Oct. 2008, vol. 9.9, pp. 1114-ITC0000356-1114-ITC0000407.
U.S. Appl. No. 61/922,631, pp. 1-75, filed Dec. 31, 2013.
U.S. Appl. No. 62/025,463, pp. 1-184 filed Jul. 16, 2014.
SJ, "Measure Methods of Light Emitting Diode (LED) Panels," SJ/T 11281-2007, SJ/T 11281-2003, 2007, pp. 1114-ITC0002365-1114-ITC0002385.

(56) References Cited

OTHER PUBLICATIONS

SJ, "LED generic Specification for LED Panels," SJ/T 11141-2012, SJ/T 11141-2003, 2012, pp. 1114-ITC0002341-1114-ITC0002364.
SMD Diodes, "Semi-Transparent Led Curtain," Mar.-Apr. 2011, pp. 1114-ITC0004198-1114-ITC00044202.
Sony, "Large LED Display System," LPU-1601 LED Display Panel Unit, LPU-2001 LED Display Panel Unit, LDC-HD01 LED Display Control Processor, 2011, 1114-ITC0004205-1114-ITC0004212.
Sander, "Full Color LED Unit SDM-P20-OSD4S-88," Jun. 7, 2010, Version 1-5, pp. 1114-ITC0009467-1114-ITC0009471.
European Patent Office, EP Application No. 14875899.8,, "Summons to Attend Oral Proceedings Pursuant to Rule 115 (1) EPC," dated Dec. 19, 2018, 15 pages.
Applicant Admitted Prior Art, Shenzhen Only 19×19 Panel, Feb. 17, 2013, pp. 1-20.
Applicant Admitted Prior Art, Shenzhen Only 19×19 Panel, Feb. 17, 2013, pp. 21-32.
Applicant Admitted Prior Art, UltraPanel, Dec. 1, 2012, 15 pages.

* cited by examiner

DISPLAY SYSTEM HAVING MODULE DISPLAY PANEL WITH CIRCUITRY FOR BIDIRECTIONAL COMMUNICATION

The present application claims priority to the following applications: U.S. Provisional Application 62/158,989 filed on May 8, 2015, U.S. Provisional Application 62/113,342 filed on Feb. 6, 2015, U.S. Provisional Application No. 62/093,157, filed on Dec. 17, 2014, U.S. Provisional Application No. 62/065,510, filed on Oct. 17, 2014, U.S. Provisional Application No. 62/025,463, filed on Jul. 16, 2014. These applications are incorporated herein by reference.

TECHNICAL FIELD

The present invention relates generally to a display panels and systems, and, in particular embodiments, to display system having modular display panel with circuitry for bidirectional communication.

BACKGROUND

Large displays (e.g., billboards), such as those commonly used for advertising in cities and along roads, generally have one or more pictures and/or text that are to be displayed under various light and weather conditions. As technology has advanced and introduced new lighting devices such as the light emitting diode (LED), such advances have been applied to large displays. An LED display is a flat panel display, which uses an array of light-emitting diodes. A large display may be made of a single LED display or a panel of smaller LED panels. LED panels may be conventional panels made using discrete LEDs or surface-mounted device (SMD) panels. Most outdoor screens and some indoor screens are built around discrete LEDs, which are also known as individually mounted LEDs. A cluster of red, green, and blue diodes, or alternatively, a tri-color diode, is driven together to form a full-color pixel, usually square in shape. These pixels are spaced evenly apart and are measured from center to center for absolute pixel resolution.

Many LED display manufacturers sell displays with different resolutions. A present disadvantage of these LED displays is that each one must be a different size to accommodate the pitch needed to obtain the desired resolution. In turn, the existing cabinets and mounting structures must be built to be suitable with the size of the displays.

SUMMARY

In accordance with an embodiment of the present invention, a modular display panel includes a plastic housing having a recess, a printed circuit board disposed in the recess, a plurality of light emitting diodes (LEDs) attached to the printed circuit board, a transparent potting compound overlying the LEDs, a driver circuit attached to the printed circuit board, and a heat sink disposed between a back side of the housing and the printed circuit board. The heat sink thermally contacts the back side of the housing and the printed circuit board. The panel also includes a power supply and a network interface controller.

In accordance with another embodiment of the present invention, a display panel includes a plurality of display elements, and a housing enclosing the display elements. The housing is sealed with respect to external elements. A first enclosure is disposed outside the housing and mounted to a back side of the housing. The first enclosure includes a power supply circuitry for supplying power to the plurality of display elements. A second enclosure is disposed outside the housing and mounted to the back side of the housing. The second enclosure includes a media processing chip including a network interface card coupled to the plurality of display elements.

A modular multi-panel display system includes a mechanical support structure, and a plurality of display panels mounted to the mechanical support structure so as to form an integrated display panel. Each one of the plurality of display panels includes a media processing chip including a network interface card configured to enable bidirectional communication, where ones of the display panels each include a first integrated data and power input point connected to a first adjacent display panel to receive data and AC power from the first adjacent display panel, and where the ones of the display panels each also include a second integrated data and power input point connected to a second adjacent display panel to provide data and AC power to the second adjacent display panel.

BRIEF DESCRIPTION OF THE DRAWINGS

For a more complete understanding, reference is now made to the following description taken in conjunction with the accompanying drawings in which:

FIGS. 7A and 7B, illustrates a display panel in accordance with an embodiment of the present invention, wherein FIG. 7A illustrates a cross-sectional view of a display panel while FIG. 7B illustrates a system diagram schematic of the display panel in accordance with an embodiment of the present invention;

DETAILED DESCRIPTION OF ILLUSTRATIVE EMBODIMENTS

In the following discussion, exterior displays are used herein for purposes of example. It is understood that the present disclosure may be applied to lighting for any type of interior and/or exterior display.

Installation of large display panels is a labor intensive process requiring skilled labor working in dangerous conditions for extended times. For example, to install a conventional display on a large multi-story building, the installers have to climb to the mounting wall (typically many stories high) and individually screw in each display and the corresponding cables etc. This is both time consuming and poses a significant safety threat thereby increasing the cost of the system dramatically.

Further, it is very difficult to know when a panel becomes defective. Typically, an observer or a customer has to take notice and inform the operator of the billboard when one or more panels are not functioning or functioning poorly. Embodiments of the present invention overcome these and other limitations by enabling bidirectional communication in which the billboard includes intelligence to initiate the replacement.

Further, when a particular display becomes defective during operation, the cost of replacement can be very high due to need for a highly skilled person to work in such difficult working conditions. The defective display has to be individually removed and replaced from the housing or cabinet in which it is mounted.

Embodiments of the invention provide preassembled display panel units, each of which provides a completely self-contained building block that is lightweight. Consequently, replacement of defective units is very simple and a person with no skill can easily remove and replace a defective display. Accordingly, embodiments of the present invention significantly reduce the operating cost of the display.

These display units are designed to be weather proof, without a heavy cabinet, although it is understood that the present disclosure may be applied to lighting for any type of interior and/or exterior display. The lightweight design allows for easier installation and maintenance, thus lowering total cost of ownership.

Embodiments of the invention provide building block panels that are configurable with future expandability. These displays can offer complete expandability to upgrade in the future without having to replace the entire display. Installation is fast and easy with very little down-time, which allows any electronic message to be presented more quickly.

In various embodiments, the display panels are "hot swappable." By removing one screw in each of the four corners of the panel, servicing the display panel is fast and easy. Since a highly-trained, highly-paid electrician or technician is not needed to correct a problem, cost benefits can be achieved.

Embodiments of the invention relate to lighting systems and, more particularly, to multi-panel lighting systems for providing interior or exterior displays.

Figure 1:
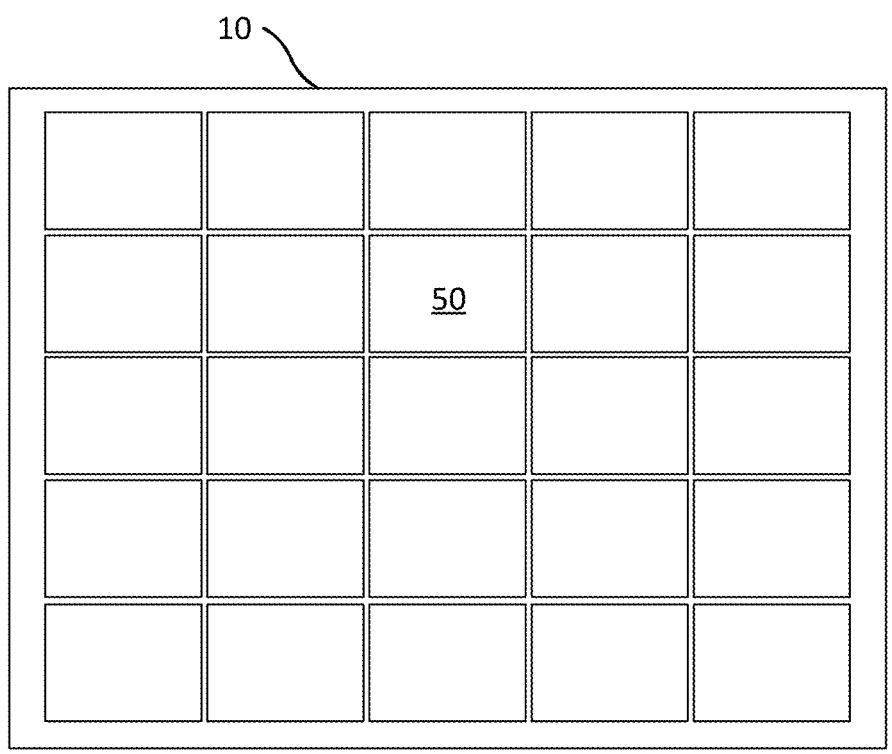
FIG. 1 illustrates a modular display panel in accordance with an embodiment of the present invention.
Figure 2:
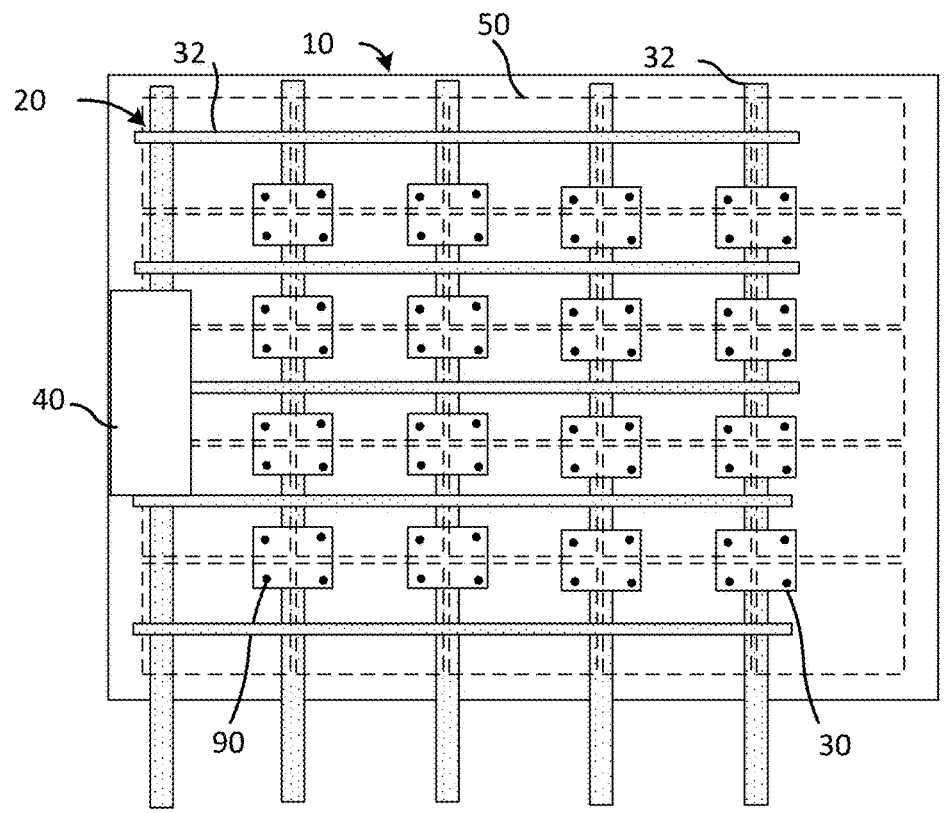
FIG. 2 illustrates a modular display panel attached to a supporting frame in accordance with an embodiment of the present invention.
Figure 3:
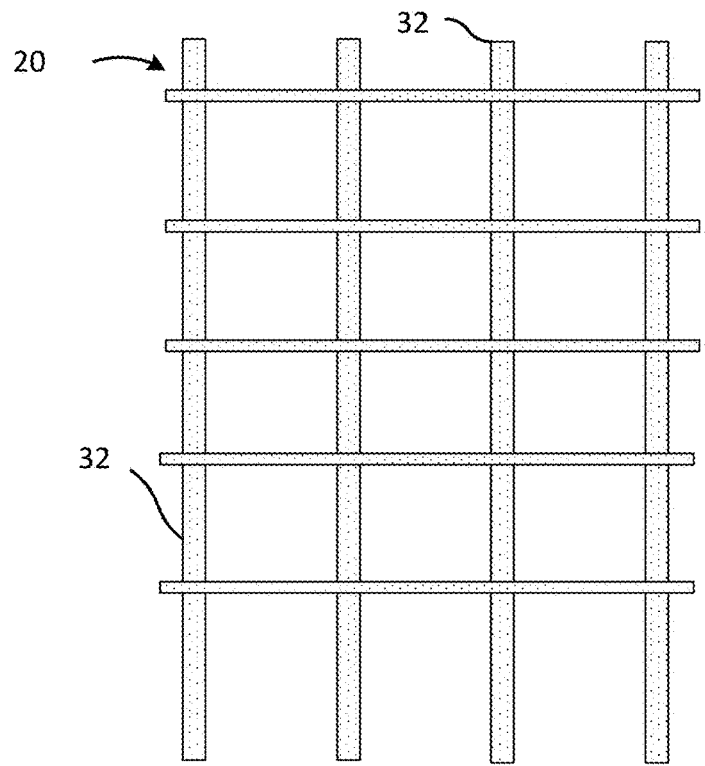
FIG. 3 illustrates a frame used to provide mechanical support to the modular display panel in accordance with an embodiment of the present invention.

FIG. 1 illustrates a modular display panel in accordance with an embodiment of the present invention. FIG. 2 illustrates a modular display panel attached to a supporting frame in accordance with an embodiment of the present invention. FIG. 3 illustrates a frame used to provide mechanical support to the modular display panel in accordance with an embodiment of the present invention.

The multi-panel modular preassembled display unit 10 comprises a plurality of LED display panels 50. In various embodiments describe herein, the light emitting diode (LED) display panels 50 are attached to a frame 20 or skeletal structure that provides the framework for supporting the LED display panels 50. The LED display panels 50 are stacked next to each other and securely attached to the frame 20 using attachment plate 30, which may be a corner plate in one embodiment. The attachment plate 30 may comprise holes through which attachment features 90 may be screwed in, for example.

In various embodiments, the preassembled display unit 10 may be used in a window display, billboard display, or other types of displays such as video walls, personal display screens and others. The preassembled display unit 10 may be sound enabled, for example, coupled to a common sound system in some embodiments. The sound system may be activated or deactivated depending on external conditions such as the presence of a user in some embodiments.

Referring to FIGS. 1 and 2, the LED display panels 50 are arranged in an array of rows and columns. Each LED display panel 50 of each row is electrically connected to an adjacent LED display panel 50 within that row.

Referring to FIG. 3, the frame 20 provides mechanical support and electrical connectivity to each of the LED display panels 50. The frame 20 comprises a plurality of beams 32 forming the mechanical structure. The frame 20 comprises a top bar, a bottom bar, a left bar, a right bar, and a plurality of vertical bars extending from the top bar to the bottom bar, the vertical bars disposed between the left bar and the right bar. The top bar, the bottom bar, the left bar and the right bar comprise four inch aluminum bars and wherein the vertical bars comprise 2"×4"×½" aluminum tubes. The top bar, the bottom bar, the left bar and the right bar are each capable of bearing a load of 1.738 lb/ft and the vertical bars are each capable of bearing a load of 3.23 lb/ft.

The size of the individual panels may vary, for example, may be 2 ft×3 ft, 3 ft×4 ft, as examples. For example, a display system could include 336 panels that are each 1'×2' in dimension to create a 14'×48' display. In such a display, because each panel is lighter than typical panels, the entire display could be built to weigh only 5500 pounds. This compares favorably to commercially available displays of the size, which generally weigh from 10,000 to 12,000 pounds. In another embodiment, a display system could include 320 LED display panels 50 arranged in ten rows and thirty-two columns so that the integrated display panel 100 has a display surface that is approximately fifty feet and four inches wide and fifteen feet and eight and three-quarters inches high. In other embodiments, displays with an arbitrary number of panels can be used.

The frame 20 may include support structures for the electrical cables, data cables, electrical power box powering the LED display panels 50, data receiver box controlling power, data, and communication to the LED display panels 50.

However, the frame 20 does not include any additional enclosures to protect the LED panels, data, power cables from the environment. Rather, the frame 20 is exposed to the elements and further exposes the LED display panels 50 to the environment. The frame 20 also does not include air conditioning, fans, heating units to maintain the temperature of the LED display panels 50. Rather, the LED display panels 50 are hermetically sealed themselves and are designed to be exposed to the outside ambient. Further, in various embodiments, there are no additional cabinets that are attached to the frame 20 or used for housing the LED display panels 50. Accordingly, in various embodiments, the multi-panel modular preassembled display unit 10 is designed to be only passively cooled.

Figure 4:
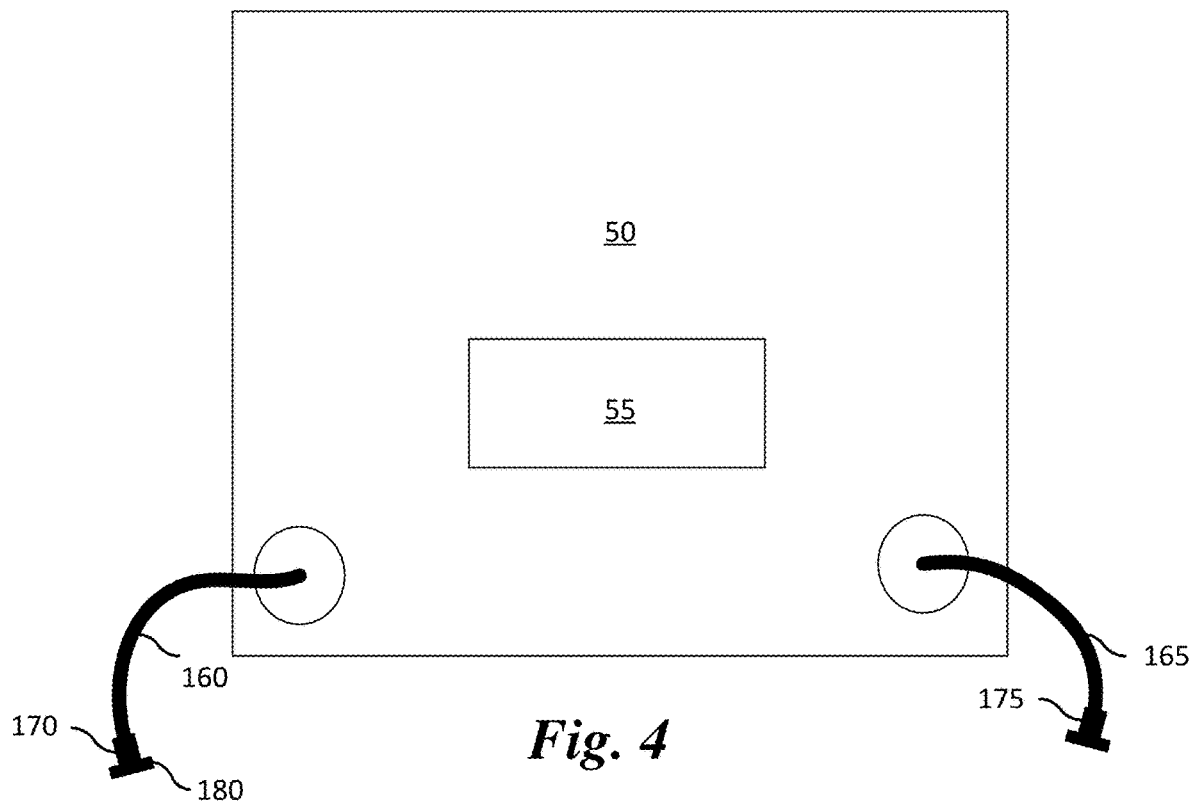
FIG. 4 illustrates one LED display panel of the multi-panel modular preassembled display unit comprising an input cable and an output cable.

FIG. 4 illustrates one LED display panel 50 of the multi-panel modular preassembled display unit 10 comprising an input cable 160 and an output cable 165. The LED display panels 50 are electrically connected together for data and for power using the input cable 160 and the output cable 165.

Each modular LED display panel 50 is capable of receiving input using an integrated data and power cable from a preceding modular LED display panel and providing an output using another integrated data and power cable to a succeeding modular LED display panel. Each cable ends with an endpoint device or connector, which is a socket or alternatively a plug.

Referring to FIG. 4, in accordance with an embodiment, a LED display panel 50 comprises an attached input cable 160 and an output cable 165, a first connector 170, a second connector 175, a sealing cover 180. The sealing cover 180 is configured to go over the second connector 175 thereby hermetically sealing both ends (first connector 170 and the second connector 175). The sealing cover 180, which also includes a locking feature, locks the two cables together securely. The input cable 160 and the output cable 1365 comprise integrated data and power wires with appropriate insulation separating them.

Figure 5:
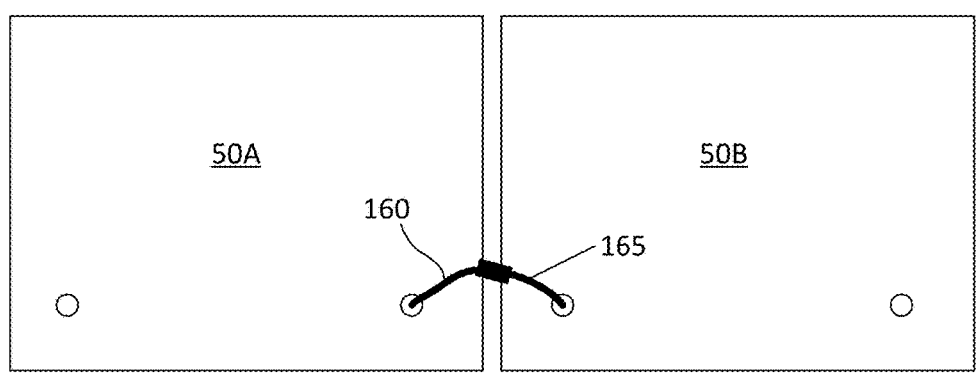
FIG. 5 illustrates two display panels next to each other and connected through the cables such that the output cable of the left display panel is connected with the input cable of the next display panel.

FIG. 5 illustrates two display panels next to each other and connected through the cables such that the output cable 165 of the left display panel 50A is connected with the input cable 160 of the next display panel 50B. The sealing cover 180 locks the two cables together as described above. In alternative embodiments, each of the panels 50A and 50B comprise a connector or a jack and a single cable connects the adjacent panels.

Figure 6:
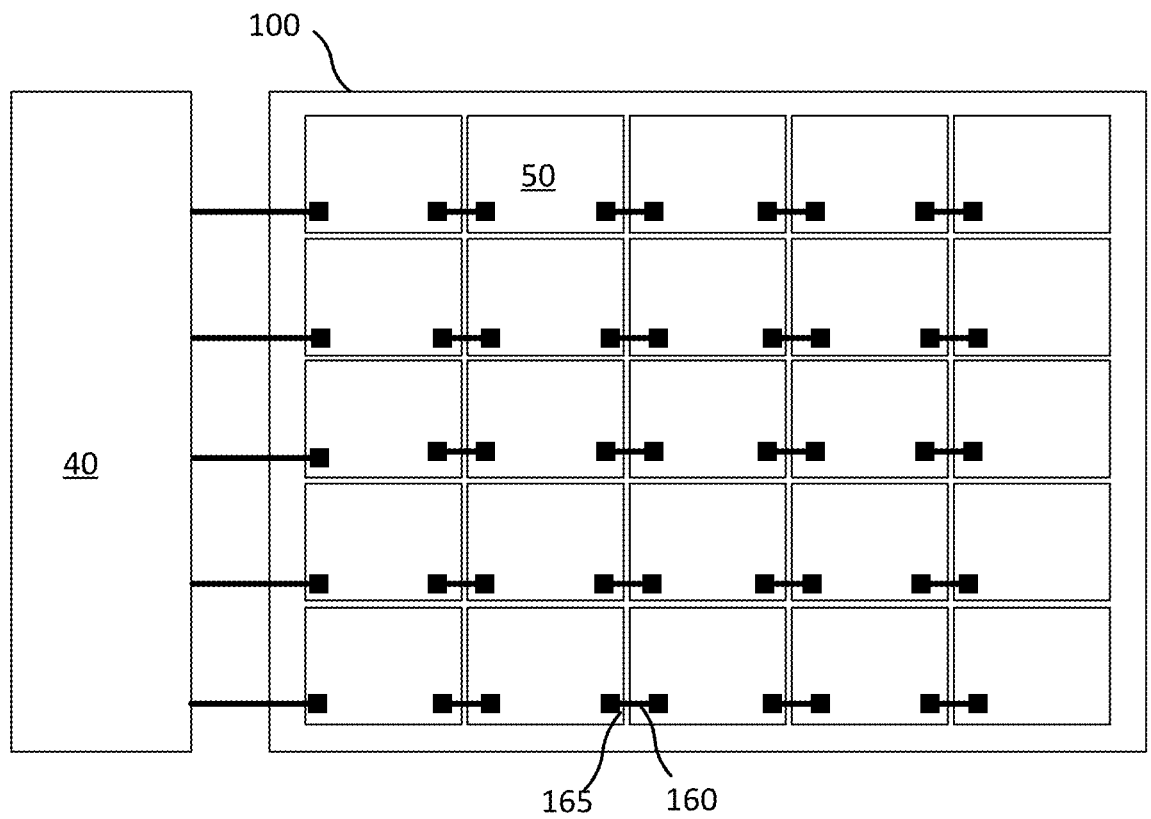
FIG. 6 illustrates a modular multi-panel display system comprising a plurality of LED display panels connected together using the afore-mentioned cables.

FIG. 6 illustrates a modular multi-panel display system comprising a plurality of LED display panels connected together using the afore-mentioned cables.

Referring to FIG. 6, for each row, a LED display panel 50 at a first end receives an input data connection from a data source and has an output data connection to a next LED display panel in the row. Each further LED display panel 50 provides data to a next adjacent LED display panel until a LED display panel 50 at second end of the row is reached. The power line is run across each row to power the LED display panels 50 in that row.

In one embodiment, the plurality of LED display panels 50 are arranged in ten rows and thirty-two columns so that the integrated display panel 100 has a display surface that is approximately fifty feet and four inches wide and fifteen feet and eight and three-quarters inches high.

In various embodiments, as illustrated in FIGS. 2 and 6, a data receiver box 40 is mounted to the mechanical support structure or frame 20. The data receiver box 40 is configured to provide power, data, and communication to the LED display panels 50. With a shared data receiver box 40, the panels themselves do not need their own receiver card. This configuration saves cost and weight.

Figure 7A:
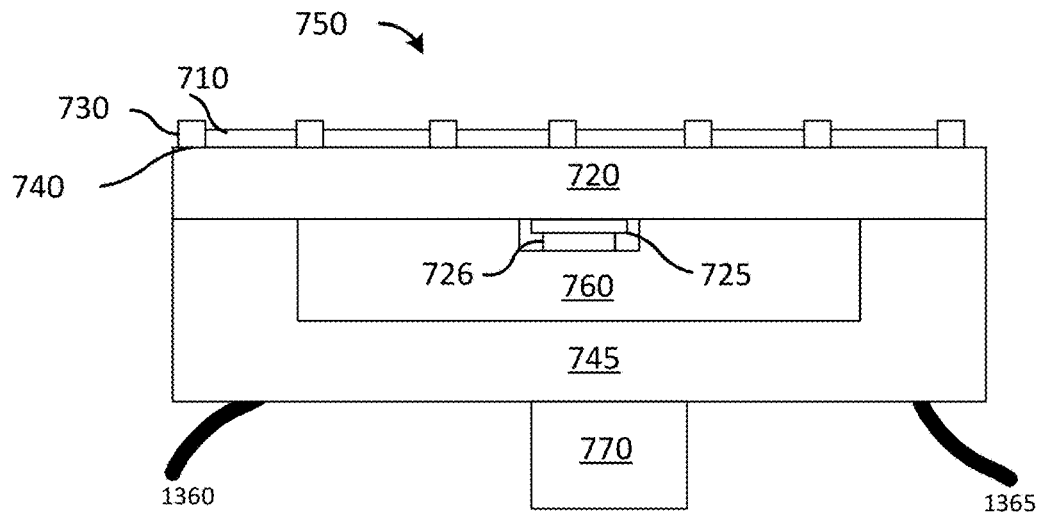
Figure 7B:
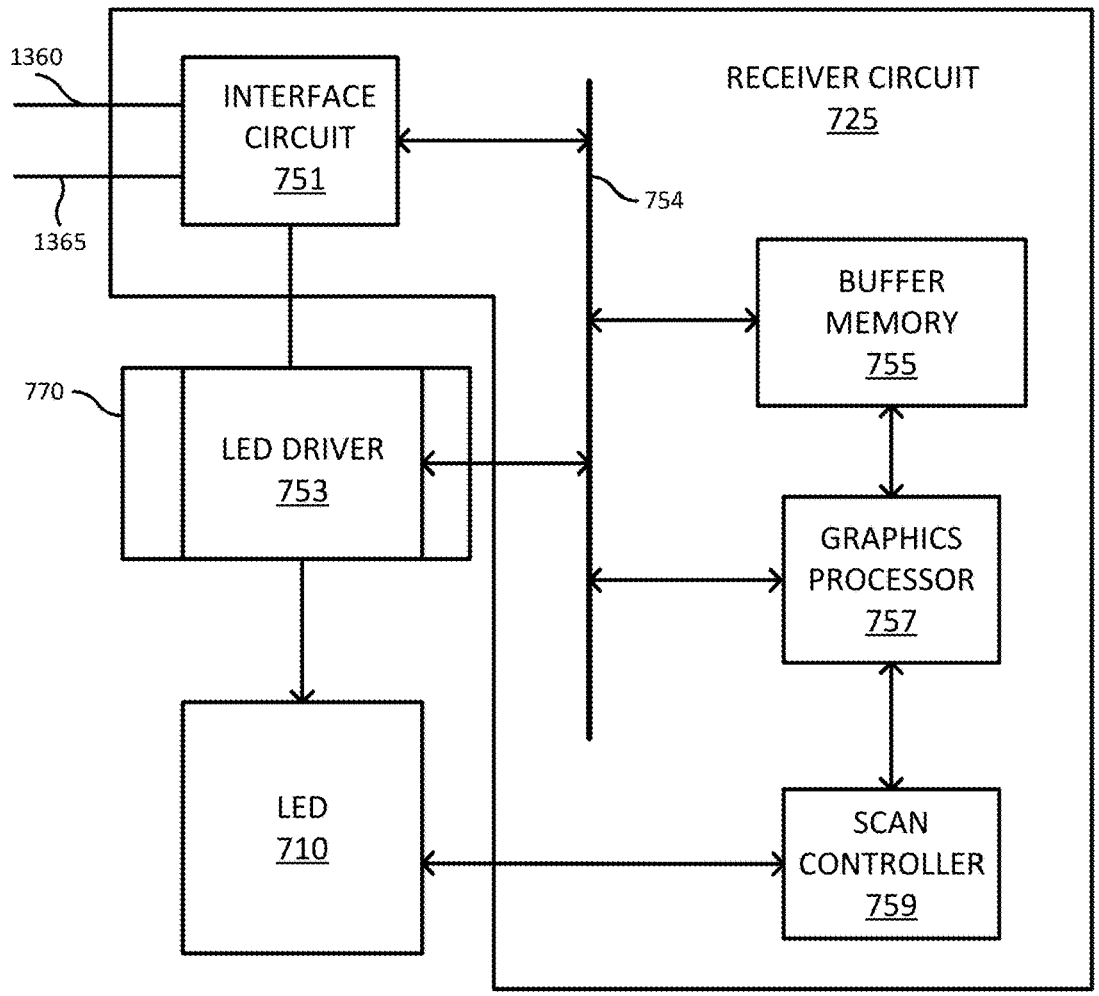

FIGS. 7A and 7B, illustrates a display panel in accordance with an embodiment of the present invention. FIG. 7A illustrates a cross-sectional view of a display panel while FIG. 7B illustrates a schematic of the display panel.

Referring to FIG. 7A, the modular LED display panel comprises a plurality of LEDs 710 mounted on one or more printed circuit boards (PCBs) 720, which are housed within a hermetically sealed enclosure or casing. A framework of louvers 730 is attached to the PCB 720 using an adhesive 740, which prevents moisture from reaching the PCB. However, the LEDs 710 are directly exposed to the ambient in the direction of light emission. The LEDs 710 are themselves water repellent and therefore are not damaged even if exposed to water. The louvers 730 rise above the surface of the LEDs and help to minimize reflection and scattering of external light, which can otherwise degrade the quality of light output from the LEDs 710.

The PCB is mounted within a cavity of an enclosure, which may be a plastic casing 745. A heat sink 760 is attached between the PCB 720 and the casing 745 and contacts both the PCB 720 and the casing 745 to maximize heat extraction. A thermal grease may be used between the back side of the casing 745 and the PCB 720 to improve thermal conduction. In one example embodiment, the thermal grease is between the heat sink 760 and the back side of the casing 745. In a further example embodiment, the thermal grease is between the PCB 720 and the heat sink 760.

A receiver circuit 725 is mounted on the PCB 720. The receiver circuit 725 may be a single chip in one embodiment. Alternatively, multiple components may be mounted on the PCB 720. The receiver circuit 725 may be configured to process the received media and control the operation of the individual LEDs 710. For example, the receiver circuit 725 may determine the color of the LED to be displayed at each location (pixel). Similarly, the receiver circuit 725 may determine the brightness at each pixel location, for example, by controlling the current supplied to the LED.

The air gap within the cavity is minimized so that heat is conducted out more efficiently. Thermally conductive standoffs 726 may be introduced between the PCB 720 to minimize the air gap, for example, between the receiver circuit 725 and the heat sink 760. The PCB 720 is designed to maximize heat extraction from the LEDs 710 to the heat sink 760. As described previously, the casing 745 of the display panel 750 has openings through which an input cable 1360 and output cable 1365 may be attached. The cables may have connectors or plugs for connecting to an adjacent panel or alternatively the casing 745 may simply have input and output sockets.

A power supply unit 770 may be mounted over the casing 745 for powering the LEDs 710. The power supply unit 770 may comprise a LED driver in various embodiments. The LED driver may include a power converter for converting AC to DC, which is supplied to the LEDs 710. Alternatively, the LED driver may comprise a down converter that down converts the voltage suitable for driving the LEDs 710. For example, the down converter may down convert a DC voltage at a first level to a DC voltage at a second level that is lower than the first level. This is done so that large DC currents are not carried on the power cables. The LED driver is configured to provide a constant DC current to the LEDs 710.

Examples of down converters (DC to DC converters) include linear regulators and switched mode converters such as buck converters. In further embodiments, the output from the power supply unit 770 is isolated from the input power. Accordingly, in various embodiments, the power supply unit 770 may comprise a transformer. As a further example, in one or more embodiments, the power supply unit 770 may comprise a forward, half-bridge, full-bridge, push-pull topologies.

The power supply unit 770 may be placed inside a Faraday cage to minimize RF interference to other components. The LED driver of the power supply unit 770 may also include a control loop for controlling the output current. In various embodiments, the display panel 750 is sealed to an IP 67 standard. As discussed herein, other ratings are possible.

FIG. 7B illustrates a system diagram schematic of the display panel in accordance with an embodiment of the present invention.

Referring to FIG. 7B, a data and power signal received at the input cable 1360 is processed at an interface circuit 751. The incoming power is provided to the LED driver 753. Another output from the incoming power is provided to the output cable 1365. This provides redundancy so that even if a component in the display panel 750 is not working, the output power is not disturbed. Similarly, the output cable 765 includes all the data packets being received in the input cable 1360.

The interface circuit 751 provides the received data packets to the graphics processor 757 through a receiver bus 754. In some embodiments, the interface circuit 751 provides only the data packets intended for the display panel 750. In other embodiment, the interface circuit 751 provides all incoming data packets to the graphics processor 757. For example, the graphics processor 757 may perform any decoding of the received media. The graphics processor 757 may use the buffer memory 755 or frame buffer as needed to store media packets during processing.

A scan controller 759, which may include an address decoder, receives the media to be displayed and identifies individual LEDs in the LEDs 710 that need to be controlled. The scan controller 759 may determine an individual LEDs color, brightness, refresh time, and other parameters associated to generate the display. In one embodiment, the scan controller 759 may provide this information to the LED driver 753, which selects the appropriate current for the particular LED.

Alternatively, the scan controller 759 may interface directly with the LEDs 710 in one embodiment. For example, the LED driver 753 provides a constant current to the LEDs 710 while the scan controller 759 controls the select line needed to turn ON or OFF a particular LED. Further, in various embodiments, the scan controller 759 may be integrated into the LED driver 753.

Figure 8:
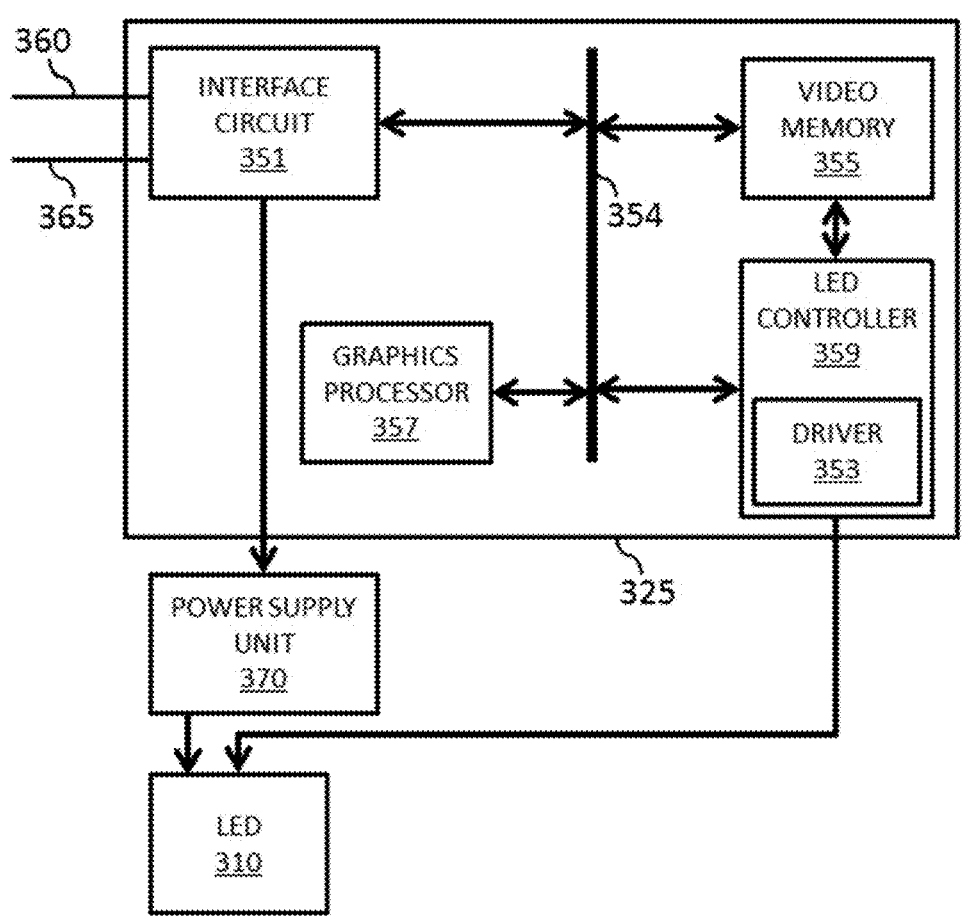
FIG. 8 illustrates an alternative system diagram schematic of the display panel in accordance with an embodiment of the present invention.

FIG. 8 illustrates an alternative system diagram schematic of the display panel in accordance with an embodiment of the present invention.

Referring to FIG. 8, a data and power signal received at first cable 360 is processed at an interface circuit 351 of receiver circuit 325. The incoming power is provided to a power supply unit 370.

Another output from the incoming power is provided to second cable 365. This provides redundancy so that even if a component in the LED display panel 150 is not working, the output power is not disturbed. Similarly, second cable 365 includes all the data being received in first cable 360.

In this embodiment, the interface circuit 351 provides the received data to the graphics processor 357 through a data bus 354. In some embodiments, the interface circuit 351 provides only the data segments intended for the LED display panel 150. In other embodiments, the interface circuit 351 provides all incoming data to the graphics processor 357. For example, the graphics processor 357 may perform any necessary decoding or (when signaling between panels is analog) analog-to-digital conversion of the received media. In other embodiments, the interface circuit 351 interfaces directly with the LED controller 359 without use of a graphics processor 357. In the embodiment of FIG. 3B, the graphics processor 357, LED controller 359, or interface circuit 351 may use the buffer video memory 355 as needed to store video segments during processing. In some embodiments, the buffer video memory 355 may be a component of the LED controller 359. The buffer video memory 355 may also be used to digitally store video segments temporarily until the receiver circuit 325 collects enough data for simultaneous display by the LEDs 310. This collection of data may be a video frame for simultaneous display by all of the LEDs of the display panel, or it may be a smaller portion of data for display by a subset of the LEDs in accordance with, for example, a scanning pattern. The buffer video memory 355 may also be used to temporarily store video segments destined for other display panels.

The LED controller 359, which may include an address decoder (e.g., a demultiplexer), receives the media to be displayed and identifies individual LEDs in the LEDs 310 that need to be controlled. The LED controller 359 may determine an individual LED's color, brightness, refresh time, and other parameters associated to generate the display. For example, at each pixel location in the display, the color of the pixel may be selected by powering one or more combination of red, blue, green, and white LEDs. The LED controller 359 may include control circuitry such as a row selector and column selector for determining LED parameters as an example. In one embodiment, the LED controller 359 may provide these LED parameters to the current driver 353, which acts as either a current source or a current sink to select the appropriate current for the particular LED. In some embodiments, the current driver 353 acts as a current source or sink to provide a constant current with a constant pulse width to the LEDs 310. In other embodiments, the current driver 353 varies the duty cycle of a constant current to pulse width modulate the brightness of the LEDs 310. The current driver 353 may either be a component of the LED controller 359 or may be located outside the LED controller 359, such as, for example, being located inside the power supply unit 370.

The power supply unit 370 may include, for example, a power converter for converting AC to DC, which is supplied to the LEDs 310. Alternatively, the power supply unit 370 may include a down converter that down converts the voltage suitable for driving the LEDs 310.

In one embodiment, the power supply unit includes a scan controller that interfaces directly with the LEDs 310. For example, the current driver 353 may provide a constant current to the LEDs 310 while a scan controller of the power supply unit 370 controls the select line needed to turn ON or OFF a particular LED. In some embodiments, a scan controller of the power supply unit 370 is implemented as an array of switches or transistors that switches incoming power to a selected row or column of LEDs 310. In other embodiments, the scan controller switches the output of the LED controller 359 to a selected row or column. The scan controller switches the LED controller output or power in accordance with, for example, an LED address, a row address, a column address, a pre-configured scanning pattern for scan groups of linked LEDs that should be activated simultaneously, or a scan select signal that specifies which scan group should be activated.

Figure 9:
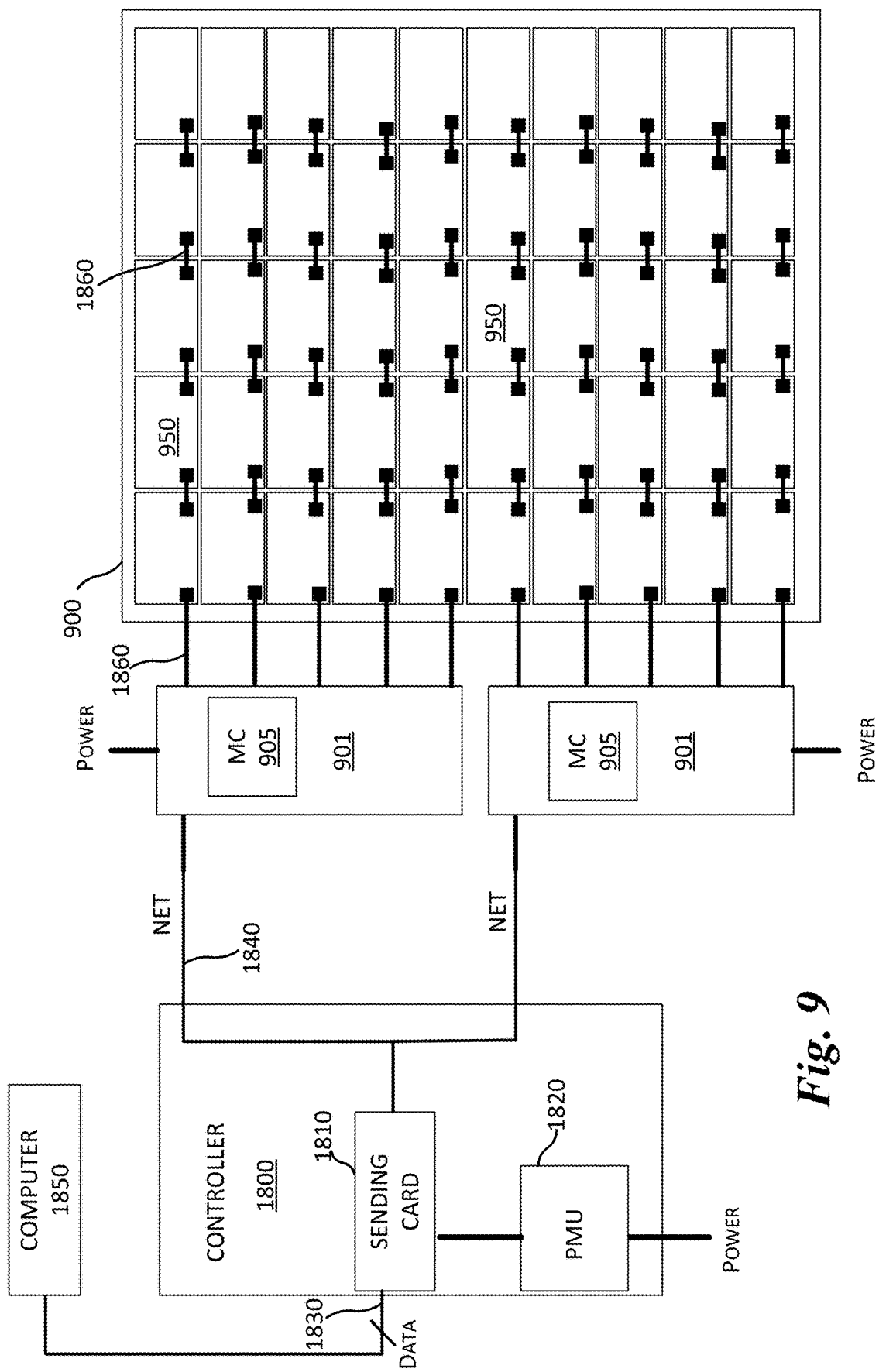
FIG. 9 illustrates an embodiment of the present invention describing a monitoring controller disposed within a data receiver box.

FIG. 9 illustrates an embodiment of the present invention describing a monitoring controller 905 disposed within a data receiver box 901. The monitoring controller 905 is configured to monitor power failure in one or more display panels 950 and report to the computer 1850 or to a different receiving monitoring server. In various embodiments, the monitoring controller 905 is configured to monitor illumination or brightness of one or more panels. The monitoring controller 905 may also monitor the network between the data receiver box 901 and the outside internet including computer 1850 as well as the local area network (or equivalent wireless network) connecting the individual display panels 950 of the display system 900.

The monitoring controller 905 may be used for other purposes as well. For example, in one or more embodiments, the display panels 950 may include one or more sensors to self-regulate operation based on external conditions. For example, the sensor may reduce or increase the brightness of the display panels based on the ambient light. Alternatively, in some embodiments, the display panels may sense the presence of an observer (e.g., human) and modulate the content being displayed. For example, the display may be powered off until a human approaches the display.

Figure 10:
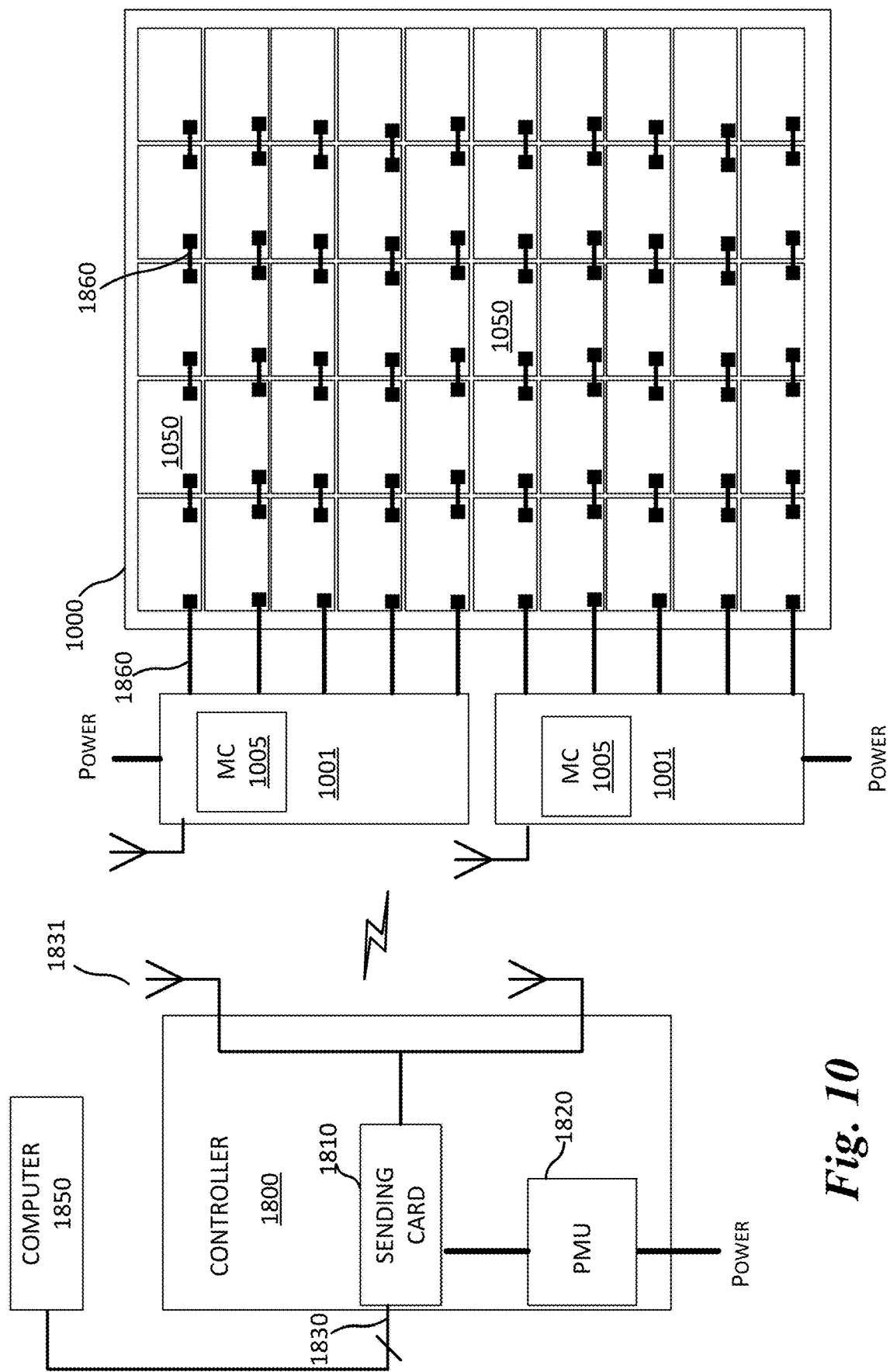
FIG. 10 illustrates an alternative embodiment, in which the data receiver box also has wireless connectivity.

FIG. 10 illustrates an alternative embodiment, in which the data receiver box 1001 also has wireless connectivity. The data receiver box 1001 may include wired data connection as described in FIG. 9, as well as wireless data connection as illustrated in FIG. 10. Accordingly, for example, if a network failure is detected, the monitoring circuit 1005 may generate an error message, which is then transmitted to a monitoring server or the computer 1850 using the wireless channel.

Figure 11:
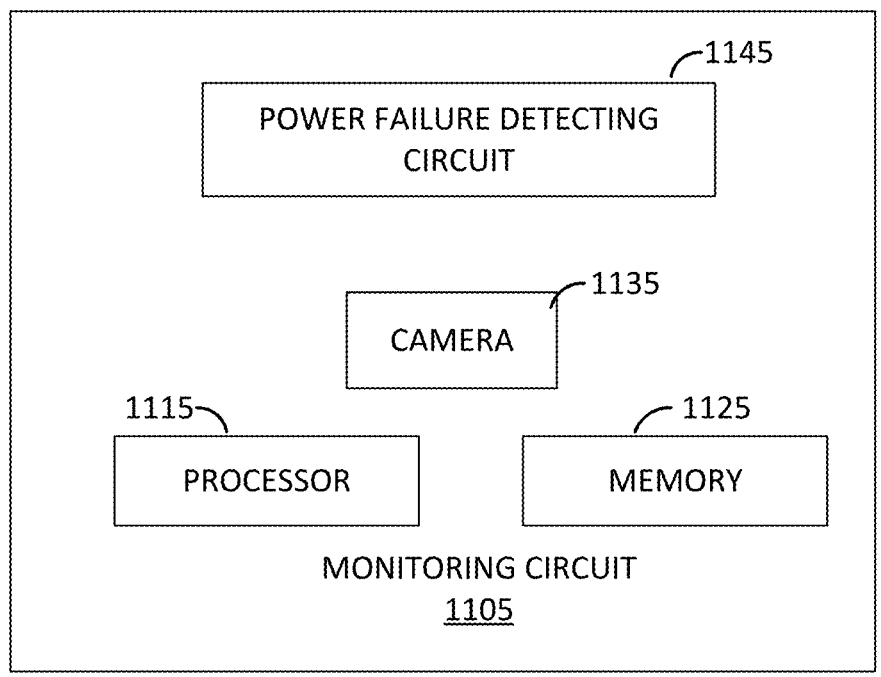
FIG. 11 illustrates a general schematic of a monitoring circuit in accordance with an embodiment of the present invention.

FIG. 11 illustrates a general schematic of a monitoring circuit in accordance with an embodiment of the present invention.

In one or more embodiments, as illustrated in FIG. 11, a monitoring circuit 1105 may include a power failure detecting circuit 1145, a camera 1135, which may include both visible, infrared and other spectrum to collect additional information. The monitoring circuit 1105 may include a processor 1115 or may use the common processor within the data receiver box. The camera may be automatically periodically activated to image the display system. The image may be processed to identify any issues with the display. For example, using an image processing software executing on the processor 1115, the power failure, dark pixels, lowered brightness may be detected. In case of a failure, a failure message is generated and transmitted to a monitoring server.

The monitoring circuit 1105 may include a memory 1125 to store the images and the results of the processing. In one or more embodiments, the monitoring circuit may include only a camera 1135. In one embodiment, the camera 1135 may be a sensor to measure brightness.

The processing may be performed remotely, for example, in some embodiments. The camera 1135 may periodically capture images of the display system and send the unprocessed image to a monitoring server performing the remaining monitoring functions. Accordingly, a more detailed image processing analysis may be performed at the remote media server, which is likely to have better computational power than the on-site processing at the display.

Figure 12:
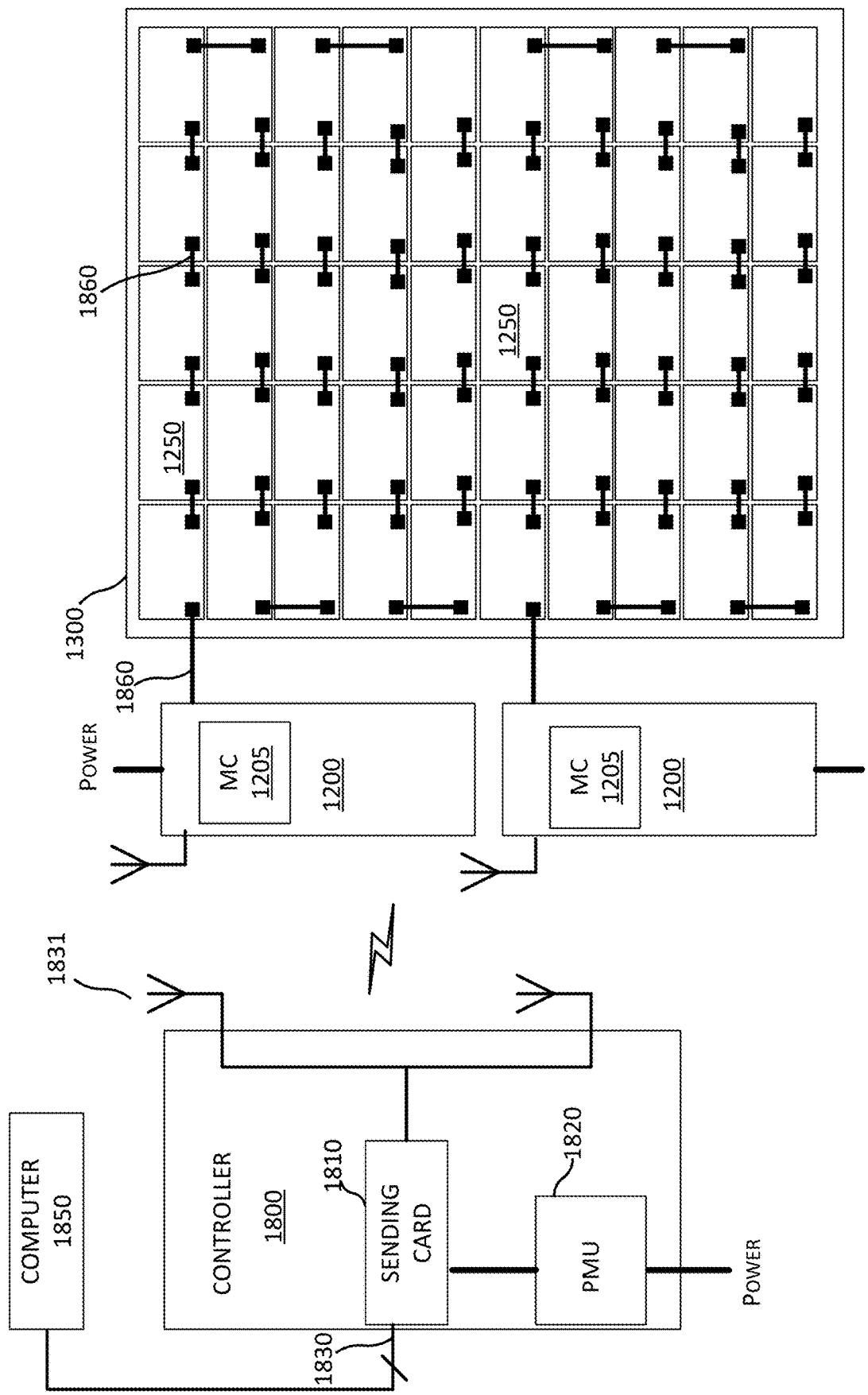
FIG. 12 illustrates an embodiment of the present invention in which the display panels are connected serially.

FIG. 12 illustrates an embodiment of the present invention in which the display panels 1250 are connected serially.

In this embodiment, each individual display panel 1250 includes a media processing chip comprising a network interface card. Thus each panel has an individual media access control (MAC) address, which enables each display panel 1250 to communicate in both directions (receive and send data).

In one or more embodiments, the display panels 1250 may be powered using a serial connection. In this embodiment, the use of a monitoring circuit 1205 within the data receiver box 1200 may be optional because each individual panel may be configured to communicate bidirectionally. Accordingly, the functioning of the monitoring circuit 1205 may be incorporated into the individual panel. For example, each panel 1250 may include software and/or hardware to perform the monitoring functions. If a defect is identified within the panel 1250 (or on an adjacent panel), the panel 1250 communicates the detection of the defect to the controller 1800.

Figure 13A:
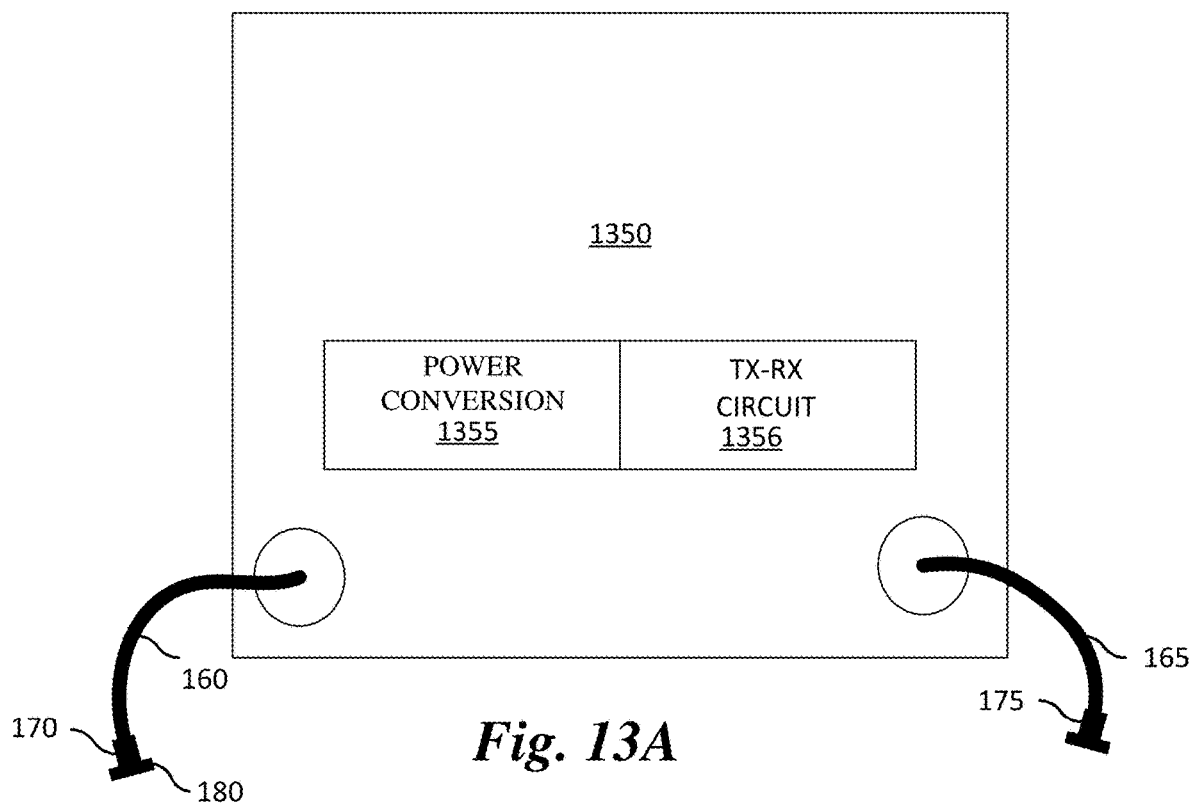
FIG. 13A illustrates a back side of an individual LED display panel in accordance with an embodiment of the present invention.

FIG. 13A illustrates a back side of an individual LED display panel in accordance with an embodiment of the present invention.

Referring to FIG. 13A, in one embodiment, the back side of an individual LED panel 1350 has enclosures for attaching a power conversion unit 1355 and a TX-RX circuit 1356. The TX-RX circuit 1356 may be a media processing chip comprising a network interface controller, for example. In one or more embodiments, the power conversion unit 1355 and the TX-RX circuit 1356 are both placed within separate enclosures and mounted to the back side of the LED display panel 1350. Alternatively, in one embodiment, the power conversion unit 1355 and the TX-RX circuit 1356 are both placed within the same enclosure and mounted to the back side of the LED display panel 1350.

In a further embodiment, the TX-RX circuit 1356 may be incorporated within the panel casing, for example, within the receiver circuit 725 of FIG. 7A or mounted under the PCB 720 of FIG. 7A as a separated chip.

Figure 13B:
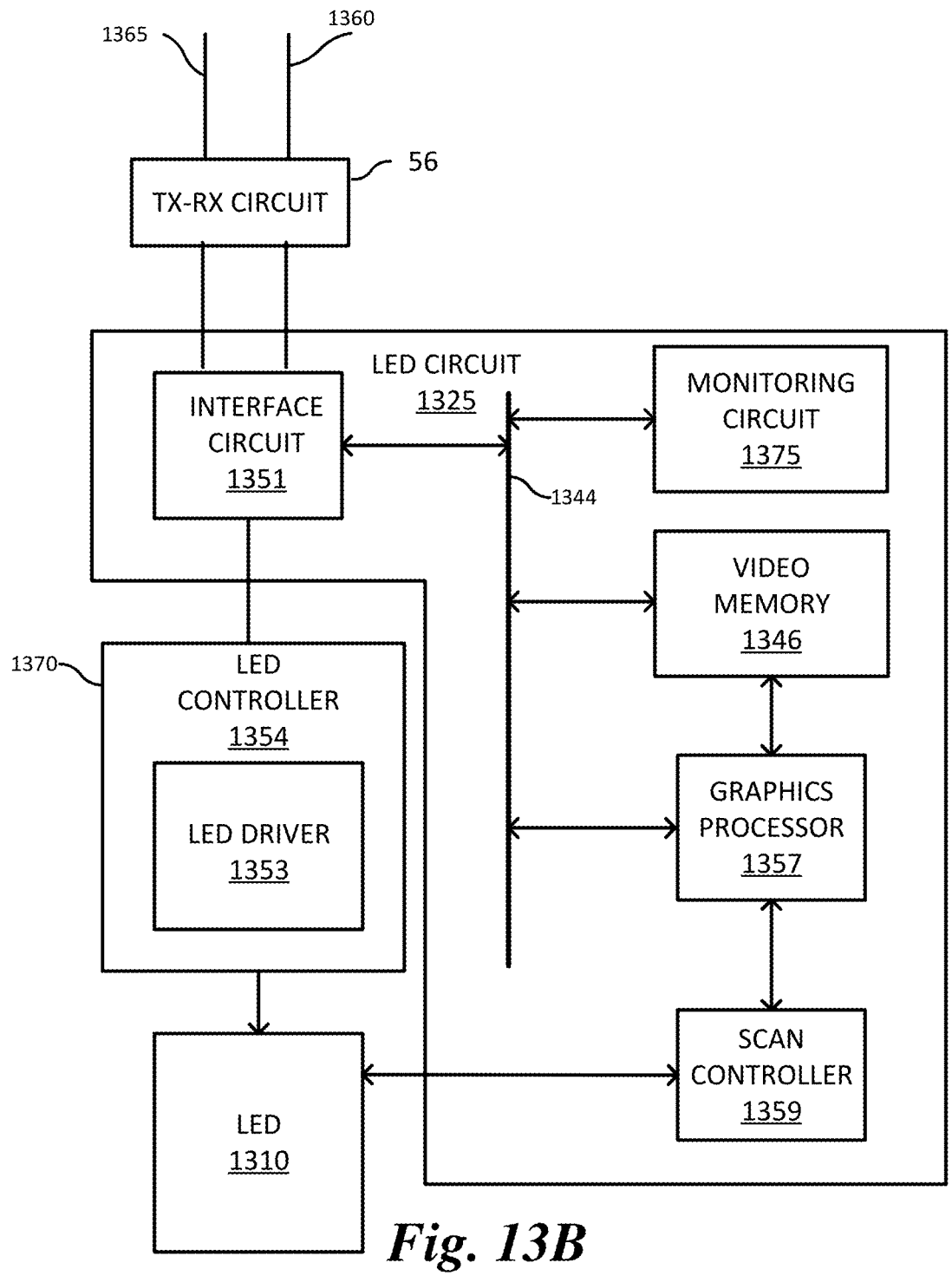
FIG. 13B illustrates a more detailed schematic of the circuit with a LED circuit showing a separate TX-RX circuit for establishing bidirectional communication.

FIG. 13B illustrates a more detailed schematic of the circuit with a LED circuit 1325 showing a separate TX-RX circuit 56 and a monitoring circuit 1375 for monitoring the panel and communicating using the established bidirectional communication. The TX-RX circuit 56 may include a unique MAC address/network card so that the device can be identified. In one or more embodiments, a single media process chip may include, i.e., integrate more than one component listed. For example, a single media processing chip is used to power and render images using the LED 1310. The media processing chip may include the functions of the TX-RX circuit 56, interface circuit 1351, bus 1344, video memory 1346, graphics processor 1357, scan controller 1359. The LED controller 1354 with the LED driver 1353 may be part of a different chip or may also be integrated.

The monitoring circuit 1375 may be implemented in software and/or hardware and may be instructions to be performed using the graphics processor 1357 or other processor available to the monitoring circuit 1375. The monitoring circuit 1375 may also include sensors such as temperature sensor, optical sensor including ambient light sensor, magnetic sensor, current sensor, power sensor, as well as other sensors. Based on the results from the sensor, the monitoring circuit 1375 determines the need to communicate with the receiver box or with a remote monitoring computer. In one embodiment, an error message is generated by the monitoring circuit 1375 identifying the type of defect and the ID of the panel and then transmitted using the TX-RX circuit 56.

Figure 14:
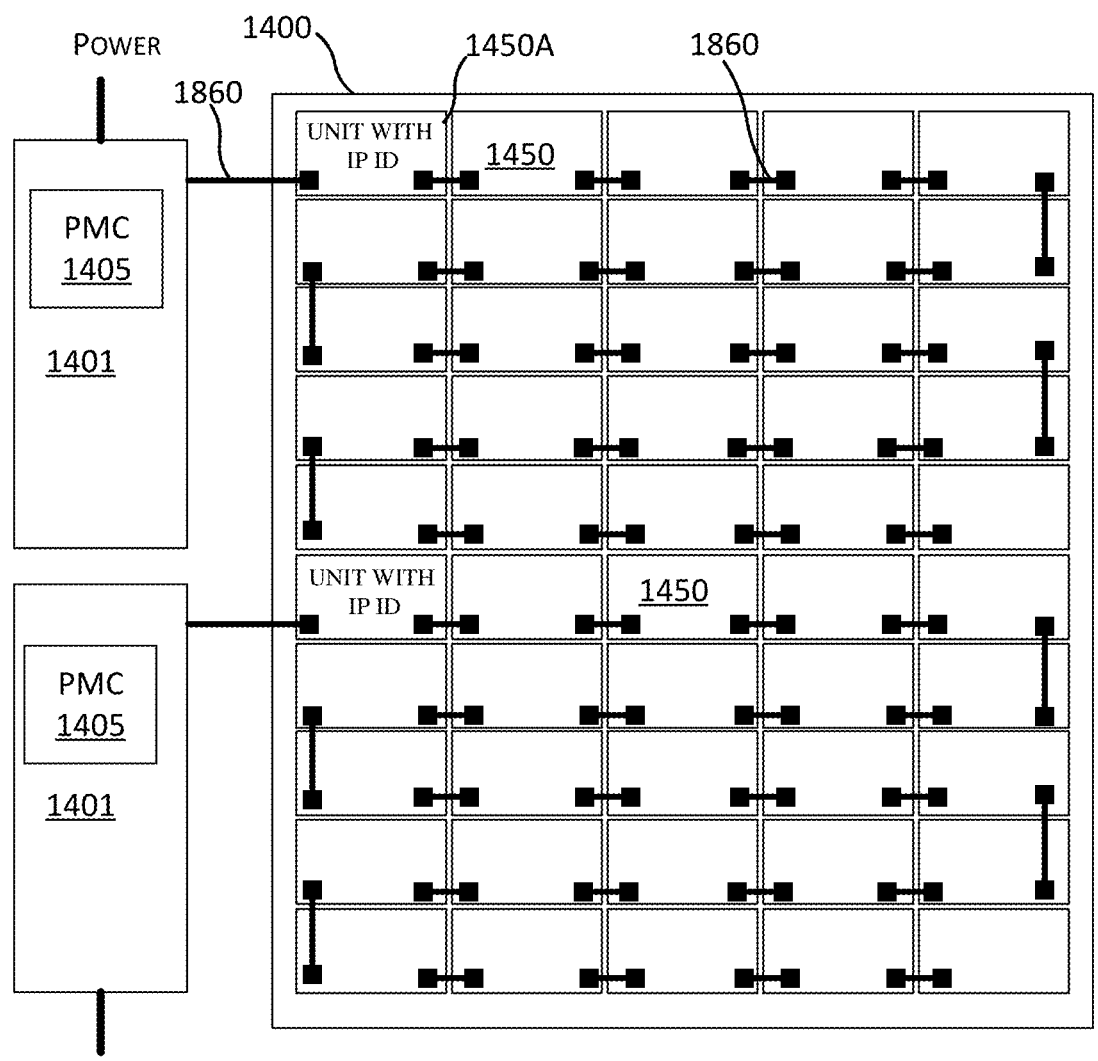
FIG. 14 illustrates an embodiment of the display system in which the data receiver box has minimal functionality.

FIG. 14 illustrates an embodiment of the display system in which the data receiver box 1400 has minimal functionality.

The data receiver box 1401 may simply connect the first display panel of the display system 1400 with an interconnect (TCP/IP) port. The first display panel may include an identifier for the whole system so that the display system advertises a single IP address. For example, the IP address of the display system 1400 may be identified from the first display panel 1450A. The remaining panels 1450 may be daisy chained.

The media processing chip within each display panel 1450 identifies and processes the correct media that is to be displayed from the data stream that includes all the media for all the panels in the chain.

The first panel in the series of panels includes a unique IP address. Thus, when connected to the internet, the network card at the first display panel 1450A receives the data to be displayed by all the panels within the same series. The remaining panels use the data processed through the common network card at the first network. The remaining panels have to be calibrated so that they know which portion of the data is to be displayed by that particular unit.

In one or more embodiments, the first display panel 1450A may include a monitoring circuit for monitoring the status of one or more panels being serviced by the first display panel 1450A.

Figure 15:
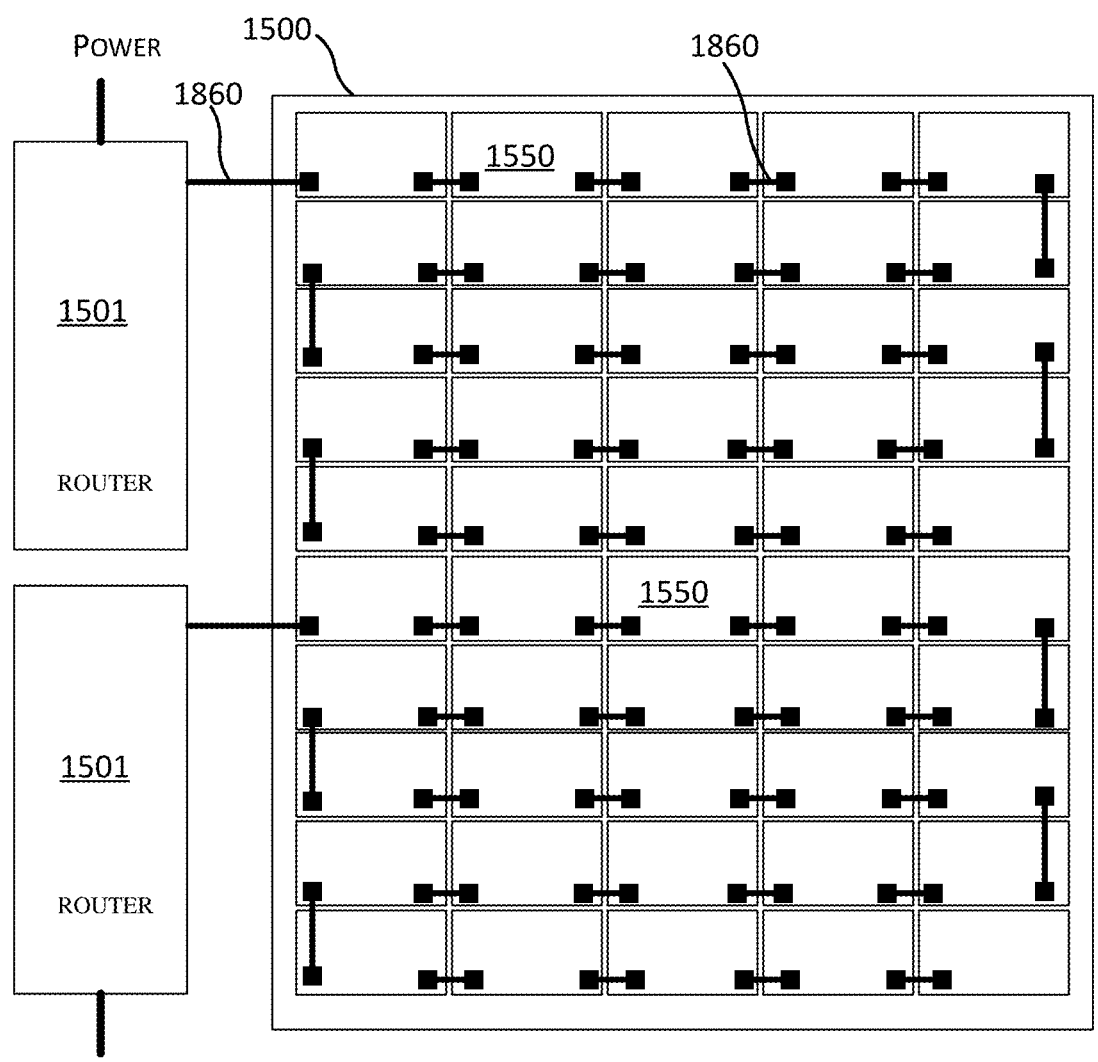
FIG. 15 illustrates an alternative embodiment of the present invention.

FIG. 15 illustrates an alternative embodiment of the present invention.

In this embodiment, a router 1501 is coupled between the display panels 1550 and the internet. The router 1501 may be coupled to a plurality of display panels 1550, where each panel has its own network interface card each thereby having its unique MAC address.

In some embodiments, the first display panel may include the router 1501, i.e., the router 1501 may be integrated into the first display panel. The devices within the local area of the router may now be individually addressed using the display panels' 1550 respective MAC address. Accordingly, packets destined to each panel are routed by the router 1501. In this embodiment, the display panels 1550 within a single display system 1500 may be served from different locations. For example, a larger part of the screen may show an advertisement from a media server whereas a lower portion may show the temperature from a weather server or a sports score from a sport network server.

In one or more embodiments, each of the display panel 1550 may include a monitoring circuit for monitoring the status of one or more panels.

Figure 16:
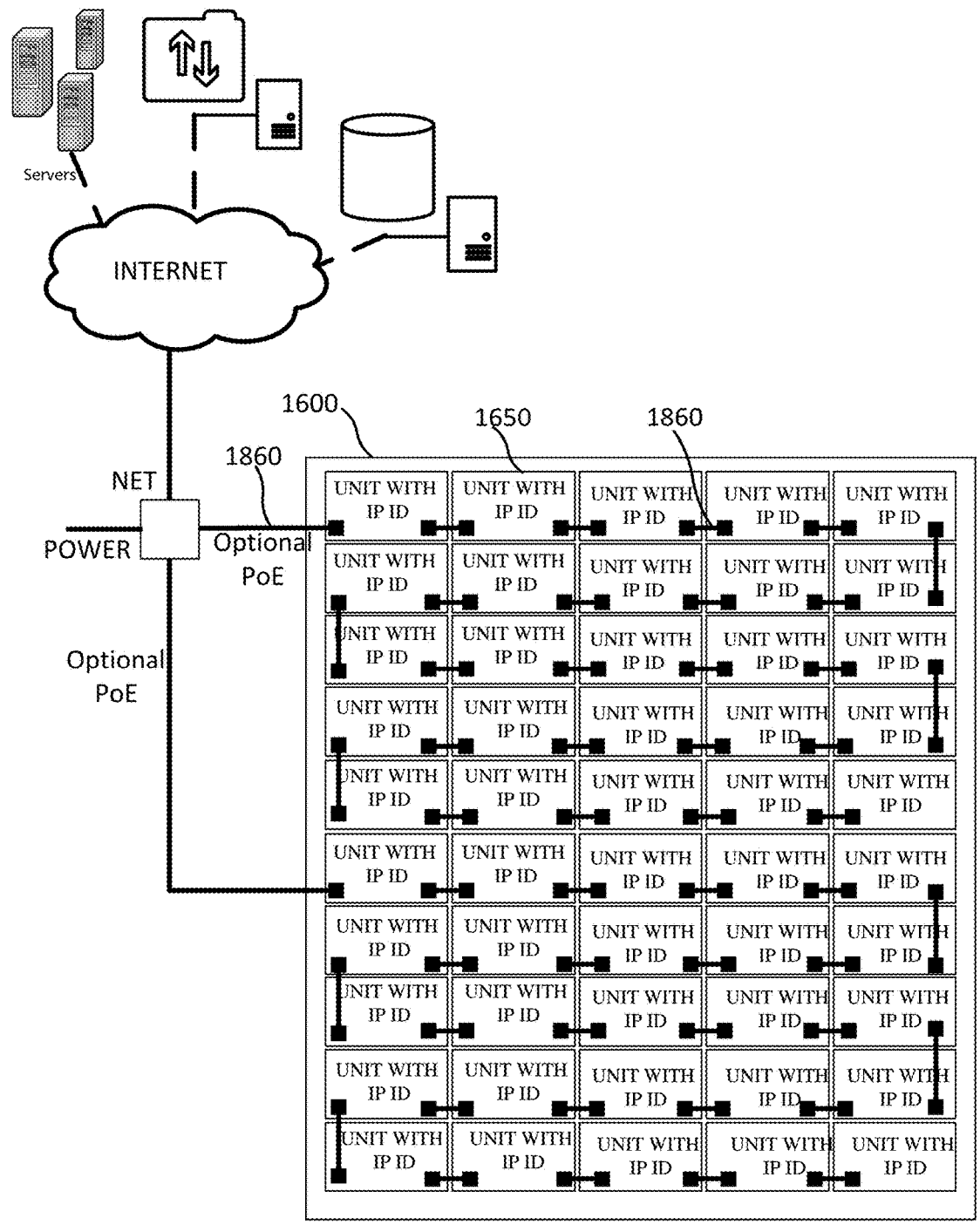
FIG. 16 illustrates an alternative embodiment of the present invention in which each display panel has a unique IPV6 IP address.

FIG. 16 illustrates an alternative embodiment of the present invention in which each display panel has a unique IPV6 IP address.

In this embodiment, each display panel 1650 of the display system 1600 has a unique IP address, for example, an IPV6 IP address. The media to be displayed may be split at the source of a single media server or may be obtained from multiple media server through the internet. For example, different portions of the display system 1600 may be leased to a different company displaying its own content. This embodiment enables multiple users to share a single display board. For example, an expensive display location may be shared in time or space by multiple companies reducing their costs while improving effectiveness of the display. The display panels may be powered individually or through Power over Ethernet technologies using cat5, cat6 cables.

In one or more embodiments, each of the display panel 1650 may include a monitoring circuit for monitoring the status of one or more panels.

Embodiments of the invention provide a display panels, each of which provides a completely self-contained building block that is lightweight. These displays are designed to protect against weather, without a heavy cabinet. The panel can be constructed of aluminum or plastic so that it will about 50% lighter than typical panels that are commercially available. The lightweight design allows for easier installation and maintenance, thus lowering total cost of ownership.

In certain embodiments, the display is IP 67 rated and therefore waterproof and corrosion resistant. Because weather is the number one culprit for damage to LED displays, and IP 67 rating provides weatherproofing with significant weather protection. These panels are completely waterproof against submersion in up to 3 feet of water. In other embodiments, the equipment can be designed with an IP 68 rating to operate completely underwater. In lower-cost embodiments where weatherproofing is not as significant, the panels can have an IP 65 or IP 66 rating.

One aspect takes advantage of a no cabinet design-new technology that replaces cabinets, which are necessary in commercial embodiments. Older technology incorporates the use of cabinets in order to protect the LED display electronics from rain. This creates an innate problem in that the cabinet must not allow rain to get inside to the electronics, while at the same time the cabinet must allow for heat created by the electronics and ambient heat to escape.

Embodiments that the do not use this cabinet technology avoid a multitude of problems inherent to cabinet-designed displays. One of the problems that has been solved is the need to effectively cool the LED display. Most LED manufacturers must use air-conditioning (HVAC) to keep their displays cool. This technology greatly increases the cost of installation and performance.

Displays of the present invention can be designed to be light weight and easy to handle. For example, the average total weight of a 20 mm, 14'×48' panel can be 5,500 pounds or less while typical commercially available panels are at 10,000 to 12,000 pounds. These units are more maneuverable and easier to install saving time and money in the process.

Embodiments of the invention provide building block panels that are configurable with future expandability. These displays can offer complete expandability to upgrade in the future without having to replace the entire display. Installation is fast and easy with very little down-time, which allows any electronic message to be presented more quickly.

In some embodiments, the display panels are "hot swappable." By removing one screw in each of the four corners of the panel, servicing the display is fast and easy. Since a highly-trained, highly-paid electrician or LED technician is not needed to correct a problem, cost benefits can be achieved.

Various embodiments utilize enhanced pixel technology (EPT), which increases image capability. EPT allows image displays in the physical pitch spacing, but also has the ability to display the image in a resolution that is four-times greater. Images will be as sharp and crisp when viewed close as when viewed from a distance, and at angles.

In some embodiments is advantageous to build multipanel displays where each of the LEDs is provided by a single LED manufacturer, so that diodes of different origin in the manufacture are not mixed. It has been discovered that diode consistency can aid in the quality of the visual image. While this feature is not necessary, it is helpful because displays made from different diodes from different suppliers can create patchy inconsistent color, e.g., "pink" reds and pink looking casts to the overall image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A modular display panel comprising:
a housing comprising plastic having a recess;
a printed circuit board disposed in the recess, wherein the printed circuit board comprises a first side and an opposite second side;
a plurality of LEDs arranged as pixels attached to the first side of the printed circuit board, wherein the pixels are arranged in an array of pixels comprising a plurality of rows and a plurality of columns;
a LED controller integrated circuit (IC) chip comprising a down converter and a driver circuit coupled to the printed circuit board, the driver circuit configured to select a current for powering the plurality of LEDs;
a media processing IC chip comprising a network interface controller comprising a unique media access control (MAC) address for being individually addressed by an external network device outside the modular display panel, wherein
the media processing IC chip physically contacts the opposite second side of the printed circuit board,
the LED controller IC chip is a different IC chip from the media processing IC chip,
the network interface controller is configured to enable bidirectional communication at both a first input/output and a second input/output of the network interface controller, the bidirectional communication being between the modular display panel, the external network device, and one or more additional modular display panels, wherein
the modular display panel is configured to communicate bidirectionally at both the first input/output and the second input/output during operation,
the modular display panel is configured to determine that the modular display panel requires replacing,
the bidirectional communication comprises data to be displayed at the modular display panel in a first direction and monitoring information of the modular display panel in an opposite second direction, the monitoring information comprising an indication that the modular display panel requires replacing, wherein the first direction is from the external network device to the modular display panel and the opposite second direction is from the modular display panel to the external network device, and
the media processing IC chip comprising the network interface controller configured to enable the bidirectional communication is disposed within the housing;
a power supply supplying power to the LED controller IC chip and the media processing IC chip;
a first integrated data and power cable comprising a first external end and a first internal end, the first integrated data and power cable extending through a back side of the housing, wherein the first internal end is enclosed within the housing and electrically coupled to the printed circuit board and the power supply, and wherein the first external end comprises a first integrated data and power connector;
a second integrated data and power cable comprising a second external end and a second internal end, the second integrated data and power cable extending through the back side of the housing, wherein the second internal end is enclosed within the housing and electrically coupled to the printed circuit board and the power supply, wherein the second external end comprises a second integrated data and power connector, and wherein the first integrated data and power connector and the second integrated data and power connector are configured to be electrically and physically connected to corresponding integrated data and power cables of adjacent additional modular display panels;
a framework of louvers disposed over the printed circuit board, the framework of louvers disposed between rows of the LEDs, wherein the framework of louvers is attached to the printed circuit board;
a height extending from a first edge of the modular display panel to an opposite second edge of the modular display panel;
a width extending from a third edge of the modular display panel to an opposite fourth edge of the modular display panel;
wherein the printed circuit board extends to within an edge distance of each of the first edge, the opposite second edge, the third edge, and the opposite fourth edge;
wherein the pixels are separated in the array by a pitch;
wherein the pitch is greater than the edge distance;
wherein the power supply comprises a power converter for converting AC power to DC power;
wherein the network interface controller is configured to transmit and receive data using an internet communications protocol; and
wherein the network interface controller is further configured to enable a unique IP address for the modular display panel.

2. The display panel of claim 1, wherein the power supply is mounted within the housing.

3. The display panel of claim 1, further comprising a sensor to detect an ambient lighting parameter and a processor to set display lighting in accordance with a detected ambient lighting parameter.

4. The display panel of claim 1, wherein the network interface controller is further configured to transmit and receive data using a near field communication protocol.

5. The panel of claim 1, wherein the down converter is configured to down convert a DC voltage at a first level to a DC voltage at a second level that is lower than the first level.

6. The display panel of claim 1, further comprising a heat sink disposed between the back side of the housing and the printed circuit board, the heat sink thermally contacting the back side of the housing.

7. The display panel of claim 1, wherein the network interface controller is configured to transmit and receive data using a wireless channel.

8. The modular display panel of claim 1, wherein the first integrated data and power connector is a socket, and wherein the second integrated data and power connector is a plug.

9. The modular display panel of claim 1, wherein the second external end further comprises a sealing cover configured to go over a corresponding first integrated data and power connector of a corresponding first integrated data and power cable of an adjacent additional modular display panel thereby hermetically sealing both the corresponding first integrated data and power connector and the second integrated data and power connector, the sealing cover comprising a locking feature securely locking the corresponding first integrated data and power cable to the second integrated data and power cable.

10. A display panel comprising:
a printed circuit board comprising a first side and an opposite second side;
a plurality of display elements attached to the first side of the printed circuit board and arranged as pixels in an array, the array comprising a plurality of rows and a plurality of columns;
a first enclosure comprising a media processing integrated circuit (IC) chip comprising a network interface card coupled to the plurality of display elements, wherein
the media processing IC chip physically contacts the opposite second side of the printed circuit board,
the media processing IC chip comprising the network interface card is disposed within the first enclosure,
the network interface card comprises an unique media access control (MAC) address,
the network interface card is configured to enable bidirectional communication at both a first input/output and a second input/output of the network interface card, the bidirectional communication being between the display panel, an external network device, and one or more additional display panels, wherein the display panel is configured to communicate bidirectionally at both the first input/output and the second input/output during operation,
the first input/output and the second input/output are each exposed through an exterior surface of the display panel,
the display panel is configured to determine that the display panel requires replacing,
the bidirectional communication comprises data to be displayed at the display panel in a first direction and monitoring information of the display panel in an opposite second direction, wherein the first direction is from the external network device to the display panel and the opposite second direction is from the display panel to the external network device, and
the monitoring information comprises an indication that the display panel requires replacing;
a second enclosure disposed outside the first enclosure and mounted to a back side of the housing, the second enclosure comprising power supply circuitry for supplying power to the plurality of display elements;
a first integrated data and power cable comprising a first external end and a first internal end, the first integrated data and power cable extending through a back side of second enclosure, wherein the first internal end is enclosed within the second enclosure and electrically coupled to the printed circuit board and the power supply circuitry, and wherein the first external end comprises a first integrated data and power connector;
a second integrated data and power cable comprising a second external end and a second internal end, the second integrated data and power cable extending through the back side of the second enclosure, wherein the second internal end is enclosed within the second enclosure and electrically coupled to the printed circuit board and the power supply circuitry, wherein the second external end comprises a second integrated data and power connector, and wherein the first integrated data and power connector and the second integrated data and power connector are configured to be electrically and physically connected to corresponding integrated data and power cables of adjacent additional display panels;
a framework of louvers disposed over the printed circuit board, the framework of louvers disposed between rows of display elements, wherein the framework of louvers is attached to the printed circuit board;
a height extending from a first edge of the display panel to an opposite second edge of the display panel;
a width extending from a third edge of the display panel to an opposite fourth edge of the display panel;
wherein the printed circuit board extends to within an edge distance of each of the first edge, the opposite second edge, the third edge, and the opposite fourth edge;
wherein the pixels are separated in the array by a pitch;
wherein the pitch is greater than the edge distance;
wherein the power supply circuitry comprises a power converter for converting AC power to DC power;
wherein the network interface card is configured to transmit and receive data using an internet communications protocol; and
wherein the network interface card is further configured to enable a unique IP address for the display panel.

11. The display panel of claim 10, further comprising a recess within the first enclosure and the printed circuit board is disposed within the recess, wherein the plurality of display elements is disposed on the printed circuit board.

12. The display panel of claim 10, wherein the first integrated data and power connector is a socket, and wherein the second integrated data and power connector is a plug.

13. The display panel of claim 10, wherein the second external end further comprises a sealing cover configured to go over a corresponding first integrated data and power connector of a corresponding first integrated data and power cable of an adjacent additional modular display panel thereby hermetically sealing both the corresponding first integrated data and power connector and the second integrated data and power connector, the sealing cover comprising a locking feature securely locking the corresponding first integrated data and power cable to the second integrated data and power cable.

14. A modular multi-panel display system comprising:
a mechanical support structure; and
a plurality of display panels mounted to the mechanical support structure so as to form an integrated display panel;
wherein each one of the plurality of display panels comprises
a plurality of light emitting diodes (LEDs) arranged as pixels attached to a first side of a printed circuit board, wherein the pixels are arranged in an array of pixels comprising a plurality of rows and a plurality of columns, wherein the printed circuit board comprises a second side opposite to the first side,
a LED controller integrated circuit (IC) chip comprising a direct current down converter and a driver circuit coupled to the printed circuit board, the driver circuit configured to select a current for powering the plurality of LEDs,
a media processing IC chip comprising a network interface card comprising a unique media access control (MAC) address for being individually addressed by an external network device outside of the respective one of the plurality of display panels,
the media processing IC chip physically contacts the second side of the printed circuit board, wherein the network interface card is configured to enable bidirectional communication at both a first input/output and a second input/output of the network interface card, the bidirectional communication being between the one of the plurality of display panels, the external network device, and one or more remaining ones of the plurality of display panels, wherein the display panel is configured to communicate bidirectionally at both the first input/output and the second input/output during operation, wherein each one of the plurality of display panels is configured to determine that the one of the plurality of display panels requires replacing, wherein the bidirectional communication comprises data to be displayed at the one of the plurality of display panels in a first direction and monitoring information of the one of the plurality of display panels in an opposite second direction, wherein the first direction is from the external network device to the display panel and the opposite second direction is from the display panel to the external network device, wherein the monitoring information comprises an indication that the one of the plurality of display panels requires replacing, and wherein the media processing IC chip comprising the network interface card configured to enable the bidirectional communication between the one of the plurality of display panels and the external network device is disposed within a housing of each one of the plurality of display panels;

wherein ones of the display panels each include a first integrated data and power input cable comprising a first external end and a first internal end, wherein the first internal end is enclosed within the housing, and wherein the first external end comprises a first integrated data and power connector connected to a corresponding integrated data and power cable of a first adjacent display panel to receive data and alternating current (AC) power from the first adjacent display panel;

wherein the ones of the display panels each also include a second integrated data and power input cable comprising a second external end and a second internal end, wherein the second internal end is enclosed within the housing, and wherein the second external end comprises a second integrated data and power connector connected to a corresponding integrated data and power cable of a second adjacent display panel to provide data and AC power to the second adjacent display panel; and wherein ones of the display panels each further include a framework of louvers disposed over the printed circuit board, the framework of louvers disposed between rows of the LEDs, wherein the framework of louvers is attached to the printed circuit board; and wherein the network interface card is configured to transmit and receive data using an internet communications protocol.

15. The system of claim 14, wherein each housing encloses the plurality of LEDs of each display panel, and wherein a common enclosure disposed outside the housing and mounted to a back side of the housing, the common enclosure comprising a power supply circuitry for supplying power to the plurality of LEDs, wherein the network interface card is disposed in the common enclosure.

16. The system of claim 14, wherein the display panels are arranged in an array of rows and columns, each display panel of each row being electrically connected to an adjacent display panel within that row via an integrated data and power cable.

17. The system of claim 16, wherein, a first panel of the plurality of display panels in a row comprises a unique IP address.

18. The system of claim 14, wherein the network interface card is configured to transmit and receive data using a near field communication protocol.

19. The system of claim 14, wherein the network interface card is configured to enable a unique IP address for each display panel.

20. The system of claim 14, wherein the network interface card is configured to transmit and receive data using a wireless channel.

21. The modular multi-panel display system of claim 14, wherein each first integrated data and power connector is a socket, and wherein each second integrated data and power connector is a plug.

22. A modular display panel comprising:
an interface circuit having a unique media access control (MAC) address, the interface circuit configured to
receive data to be displayed,
receive power for displaying the data,
transmit data to be displayed to an adjacent display panel,
transmit power for displaying the data to the adjacent display panel,
be addressable individually using the MAC address by an external network device outside the modular display panel,
establish channels for bidirectional communication at both a first input/output and a second input/output of the interface circuit, the channels for bidirectional communication being between the modular display panel, the external network device, and one or more additional modular display panels, wherein the modular display panel is configured to communicate bidirectionally at both the first input/output and the second input/output during operation, wherein the modular display panel is configured to determine that the modular display panel requires replacing, and wherein the bidirectional communication comprises data to be displayed at the modular display panel in a first direction and monitoring information of the modular display panel in an opposite second direction, the monitoring information comprising an indication that the modular display panel requires replacing, wherein the first direction is from the external network device to the modular display panel and the opposite second direction is from the modular display panel to the external network device;
a display area configured to display the data to be displayed at a front side of the modular display panel;
a power converter configured to receive the power from the interface circuit and generate a direct current;
a display controller circuit configured to
receive power from the power converter,
down convert a voltage of the received power,
select a current for powering individual display elements of the display area, and
provide the down converted received power to the individual display elements of the display area;
a display circuit comprising
a monitoring circuit configured to monitor the modular display panel and communicate using the established channels for the bidirectional communication, a memory configured to store the data, and
a processor configured to decode a graphics component of the data and provide display information to the display controller circuit;

a printed circuit board comprising a first side and an opposite second side, wherein
the front side of the printed circuit board comprises the display area,
the interface circuit is included in a media processing integrated circuit (IC) chip, and
the media processing IC chip physically contacts the opposite second side of the printed circuit board;

a first integrated data and power cable comprising a first external end and a first internal end, the first integrated data and power cable extending through a back side of a housing of the modular display panel, wherein the first internal end is enclosed within the housing and electrically coupled to the interface circuit and the power converter, and wherein the first external end comprises a first integrated data and power connector;

a second integrated data and power cable comprising a second external end and a second internal end, the second integrated data and power cable extending through the back side of the housing, wherein the second internal end is enclosed within the housing and electrically coupled to the interface circuit and the power converter, wherein the second external end comprises a second integrated data and power connector, and wherein the first integrated data and power connector and the second integrated data and power connector are configured to be electrically and physically connected to corresponding integrated data and power cables of adjacent additional modular display panels;

a framework of louvers disposed over the printed circuit board, the framework of louvers disposed between rows of the individual display elements, wherein the framework of louvers is attached to the printed circuit board;

wherein the power converter is configured to convert AC power to DC power;

wherein the interface circuit is configured to transmit and receive data using an internet communications protocol; and wherein the interface circuit is further configured to enable a unique IP address for the modular display panel.

23. The display panel of claim 22, wherein the modular display panel is configured to
transmit the monitoring information using a wireless channel, and
receive and transmit the data to be displayed to the adjacent display panel using a cable.

24. The modular display panel of claim 22, wherein the first integrated data and power connector is a socket, and wherein the second integrated data and power connector is a plug.

* * * * *